(12) United States Patent
Yu et al.

(10) Patent No.: US 11,313,348 B2
(45) Date of Patent: Apr. 26, 2022

(54) HYBRID VERTICAL AXIS TURBINE APPARATUS

(71) Applicant: UNIVERSITY OF MARYLAND, BALTIMORE COUNTY, Baltimore, MD (US)

(72) Inventors: Meilin Yu, Baltimore, MD (US); Weidong Zhu, Baltimore, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 126 days.

(21) Appl. No.: 16/851,602

(22) Filed: Apr. 17, 2020

(65) Prior Publication Data

US 2020/0332764 A1     Oct. 22, 2020

Related U.S. Application Data

(60) Provisional application No. 62/835,061, filed on Apr. 17, 2019.

(51) Int. Cl.
*F03D 3/06* (2006.01)
*F03B 17/06* (2006.01)
*F03D 3/00* (2006.01)

(52) U.S. Cl.
CPC ............ *F03D 3/065* (2013.01); *F03B 17/063* (2013.01); *F03D 3/005* (2013.01)

(58) Field of Classification Search
None
See application file for complete search history.

(56) References Cited

U.S. PATENT DOCUMENTS

| | | | |
|---|---|---|---|
| 1,697,574 A | 1/1929 | Savonius | |
| 1,766,765 A | 6/1930 | Savonius | |
| 1,835,018 A | 12/1931 | Darrieus | |
| 3,918,839 A | 11/1975 | Blackwell et al. | |
| 7,362,004 B2 | 4/2008 | Becker | |
| 8,790,069 B2 | 7/2014 | Anderson | |
| 10,774,807 B2 * | 9/2020 | Pul | F03D 3/005 |
| 2006/0275105 A1 * | 12/2006 | Roberts | F03D 3/0409 415/4.2 |
| 2009/0003999 A1 * | 1/2009 | Whitworth | F03D 3/067 415/208.1 |
| 2009/0045632 A1 * | 2/2009 | Krauss | F03D 3/0427 290/54 |
| 2009/0220342 A1 * | 9/2009 | Wu | F03D 1/02 416/124 |

(Continued)

OTHER PUBLICATIONS

R. Nobile, et al.; "Unsteady flow simulation of a vertical axis augmented wind turbine: a two-dimensional study," J. Wind Eng. Ind. Aerod., vol. 125 (2014), pp. 168-179.

(Continued)

*Primary Examiner* — Michael Lebentritt
(74) *Attorney, Agent, or Firm* — Casimir Jones, S.C.; Tristan A. Fuierer

(57) ABSTRACT

A multi-stage hybrid Darrieus-modified-Savonius (HDMS) vertical axis wind or water turbine (VAWT) for aero-hydro energy harvesting. The HDMS VAWT can continuously harvest fluid energy, including wind and water energy, provides excellent self-starting capability, has enhanced structural stability, and a high energy harvesting efficiency.

20 Claims, 23 Drawing Sheets

(56) References Cited

U.S. PATENT DOCUMENTS

| | | | | |
|---|---|---|---|---|
| 2011/0142641 A1* | 6/2011 | Anderson | F03D 3/062 | 416/132 B |
| 2011/0148116 A1* | 6/2011 | Halstead | F03D 3/02 | 290/52 |
| 2012/0007366 A1* | 1/2012 | Belden | F03D 3/064 | 290/55 |
| 2012/0148403 A1* | 6/2012 | Flaherty | F03D 13/10 | 416/1 |
| 2013/0026761 A1* | 1/2013 | Rajadhyaksha | F03B 17/062 | 290/54 |
| 2013/0195636 A1* | 8/2013 | Poole | F03D 7/06 | 415/203 |
| 2013/0287570 A1* | 10/2013 | Gdovic | F03D 3/02 | 416/124 |
| 2013/0315703 A1* | 11/2013 | Dacus | F03D 3/0418 | 415/4.4 |
| 2014/0161642 A1* | 6/2014 | Rajadhyaksha | F03B 17/063 | 417/334 |
| 2014/0265335 A1* | 9/2014 | Andreis | B63B 1/32 | 290/52 |
| 2014/0361545 A1* | 12/2014 | Ghosh | F03D 9/25 | 290/55 |
| 2016/0377053 A1* | 12/2016 | Reyna | F03D 3/005 | 415/210.1 |
| 2018/0135599 A1* | 5/2018 | Baxter, Jr. | F03D 3/061 | |
| 2019/0093629 A1* | 3/2019 | Juarez | F03D 3/005 | |
| 2019/0242361 A1* | 8/2019 | Song | F03B 17/065 | |
| 2020/0072190 A1* | 3/2020 | Buchanan | F03D 3/068 | |
| 2020/0149510 A1* | 5/2020 | Hug | F03D 7/06 | |
| 2020/0300217 A1* | 9/2020 | Reyna | F03D 3/005 | |

OTHER PUBLICATIONS

F. Trivellato, et al.; "On the Courant-Friedrichs-Lewy criterion of rotating grids in 2D vertical-axis wind turbine analysis," Renew. Energy, vol. 62 (2014), pp. 53-62.

Y. Wang, et al.; "Numerical investigation on aerodynamic performance of a novel vertical axis wind turbine with adaptive blades," Energy Convers. Manag., vol. 108 (2016), pp. 275-286.

K.W. McLaren, A Numerical and Experimental Study of Unsteady Loading of High Solidity Vertical Axis Wind Turbines, McMaster University, Ontario, Canada (2011).

A. Betz, Introduction to the Theory of Flow Machines, Pergamon Press, Oxford, UK (1966); A Book, Reference Not Attached; Abstract Only.

N.N. Sørensen, et al.; "Drag prediction for blades at high angle of attack using CFD," J. Sol. Energy Eng., vol. 126 (4) (2004), pp. 1011-1016; Abstract Only.

A. Travin, et al.; "Physical and numerical upgrades in the detached-eddy simulation of complex turbulent flows," Advances in LES of Complex Flows, Springer, Dordrecht (2002), pp. 239-254; Abstract Only.

A. Uihlein, et al.; "Wave and tidal current energy—A review of the current state of research beyond technology," Renewable and Sustainable Energy Reviews, vol. 58, pp. 1070-1081, 2016.

E. Denny, "The economics of tidal energy," Energy Policy, vol. 37, pp. 1914-1924, 2009; Abstract Only.

N. D. Laws, et al.; "Hydrokinetic energy conversion: Technology, research, and outlook," Renewable and Sustainable Energy Reviews, vol. 57, pp. 1245-1259, 2016.

F. O'Rourke, et al., "Tidal energy update 2009," Applied Energy, vol. 87, pp. 398-409, 2010.

G. T. Houlsby, et al., "The power available to tidal turbines in an open channel flow," Proceedings of the Institution of Civil Engineers—Energy, vol. 170, pp. 12-21, 2017; Abstract Only.

A. C. Orrell, et al., "2014 Distributed Wind Market Report," U.S. Department of Energy, Richland, Washington, 2015; Can Not Locate Reference.

2010 Census: Maryland Profile, Population Density by Census Tract, U.S. Census Bureau.

"Economic Research Service, Maryland, Three rural definitions based on Census Places," U.S. Department of Agriculture, 2018. Can Not Locate Reference.

"State Energy Consumption Estimates 1960 Through 2016, DOE/EIA-0214(2016), Total Energy Consumption Estimates, Real Gross Domestic Product (GDP), Energy Consumption Estimates per Real Dollar of GDP, Ranked by State, 2016.," U.S. Energy Information Administration (EIA), 2017. *different version*.

"Maryland State Profile and Energy Estimates," U.S. Energy Information Administration (EIA), 2018.

"DSIRE, Maryland, Renewable Energy Portfolio Standard," NC Clean Energy Technology Center, 2018.

S. Kerr, et al.; "Understanding community benefit payments from renewable energy development," Energy Policy, vol. 105, pp. 202-211, 2017.

T. M. Groth, et al.; "Rural wind farm development: Social, environmental and economic features important to local residents," Renewable Energy, vol. 63, pp. 1-8, 2014. Abstract Only.

"Wind energy for rural economic development," U.S. Department of Energy (DOE), Office of Energy Efficiency and Renewable Energy (EERE), DOE/GO-102004-1826, 2014. Can Not Locate Reference.

"Global Vertical Axis Wind Turbine Market Research Report 2020," Industry Research, 2020; Abstract Only.

"Tidal Energy Technology Brief," International Renewable Energy Agency (IRENA), 2014.

J. Pyper, "Large Corporations Are Driving America's Renewable Energy Boom," Greentech Media, 2017.

"Maryland Geography," World Atlas.

C. Hitaj, et al.; "Trends in U.S. Agriculture's Consumption and Production of Energy: Renewable Power, Shale Energy, and Cellulosic Biomass," United States Department of Agriculture, 2016.

US Energy Information Administration, "Renewable energy explained," US Energy Information Administration, 2018.

"Electricity installed generating capacity by country," MECOMeter.

Liu, Kan, et al.; "Enhancing wind energy harvesting performance of vertical axis wind turbines with a new gybrid design: A fluid-structure interaction study," Renewable Energy, 2019, vol. 140, pp. 912-927.

R. Wiser, et al.; "2014 Wind Technologies Market Report," U.S. Department of Energy, Berkeley, California, 2015.

S. P. Neill, et al.; "The impact of tidal stream turbines on large-scale sediment dynamics," Renewable Energy, vol. 34, pp. 2803-2812, 2009; Abstract Only.

U.S. Department of Energy; Energy Efficiency and Renewable Energy; "20% Wind Energy by 2030, Increasing Wind Energy's Contribution to U.S. Electricity Supply," 2008.

Dabiri, J.O.; Potential order-of-magnitude enhancement of wind farm power density via counter-rotating vertical-axis wind turbine arrays, J. Renew. Sustain. Energy, 2011, vol. 3, pp. 043104-1.

Kinzel, M., et al.; "Energy exchange in an array of vertical-axis wind turbines," J. Turbul., 2012, vol. 13, p. N38; Abstract Only.

Dabiri, J.O., et al.; "Emergent aerodynamics in wind farms," Phys. Today, 2014, vol. 67, pp. 66-67.

Dabiri, J.O., et al.; A new approach to wind energy: opportunities and challenges, AIP Conf. Proc., 2015, vol. 1652, pp. 51-57.

Al-Mulali, Usama, et al.; "Exploring the relationship between urbanization, energy comsumption, and CO2 emission in MENA countries," Renewable and Sustainable Energy Reviews, 2013, vol. 23, pp. 107-112.

Ishugah, T.F., et al.; "Advances in Wind Energy Resource Exploitation in urban environment: A review," Renewable and Sustainable Energy Reviews, 2014, vol. 37, pp. 613-626.

Danao, Louis Angelo, et al.; "An experimental investigation into the influence of unsteady wind on the performance of a vertical axis wind turbine," Applied Energy, 2013, vol. 107, pp. 403-411.

Danao, Louis Angelo, et al.; "A numerical investigation into the influence of unsteady wind on the performance and aerodynamics of a vertical axis wind turbine," Applied Energy, 2014, vol. 116, pp. 111-124.

Wekesa, David Wafula, et al.; "Influence of operating conditions on unsteady wind performance of vertical axis wind turbines operating

(56) References Cited

OTHER PUBLICATIONS within a fluctuating free-stream: A numerical study," J. Wind Eng. Ind. Aerodyn., 2014, vol. 135, pp. 76-89.
Wekesa, David Wafula, et al.; "A numerical analysis of unsteady inflow wind for site specific vertical axis wind turbine: A case study for Marsabit and Garissa in Kenya," Renewable Energy, 2015, vol. 76, pp. 648-661.
Wekesa, David Wafula, et al.; "Experimental and numerical study of turbulence effect on aerodynamic performance of a small scale vertical axis wind turbine," J. Wind Eng. Ind Aerodyn., 2016; vol. 157, pp. 1-14.
Paraschivoiu, I.; "Wind Turbine Design: with Emphasis on Darrieus Concept," Presses inter polytechnique, 2002; Book; Abstract Only.
Islam, Mazharul, et al.; "Aerodynamic models for Darrieus-type straight-bladed vertical axis wind turbines," Renewable and Sustainable Energy Reviews, 2008, vol. 12, pp. 1087-1109.
Eriksson, Sandra, et al.; "Evaluation of different turbine concepts for wind power," Renewable and Sustainable Energy Reviews, 2008, vol. 12, pp. 1419-1434.
Sutherland, Herbert J., et al,; "A Retrospective of VAWT Technology," Sandia Report, Sandia National Laboratories, 2012.
Mahmood, M., et al.; "Vertical axis wind turbine—A review of various configurations and design techniques," Renewable and Sustainable Energy Reviews, 2012, vol. 16, pp. 1926-1939.
MacPhee, David, et al.; "Recent advances in rotor design of vertical axis wind turbines," Wind Engineering, 2012, vol. 36, pp. 647-666.
Kang, Can, et al.; "Review of fluid dynamics aspects of Savonius-rotor-based vertical axis wind rotors," Renewable and Sustainable Energy Reviews, 2014, vol. 33, pp. 499-508.
Ragheb, M. et al.; "Vertical Axis Wind Turbines," University of Illinois at Urbana-Champaign, 2008; Can Not Locate Reference.
Baker, J.R.; Features to aid or enable self starting of fixed pitch low solidity vertical axis wind turbines, Journal of Wind Engineering and Industrial Aerodynamics, 1983, vol. 15, pp. 369-380.
Kirke, B., et al.; Enhancing the performance of vertical axis wind turbine using a simple variable pitch system, Wind Eng., 1991, vol. 15, pp. 187-195.
Li, Chao, et al.; "2.5D large eddy simulation of vertical axis wind turbine in consideration of high angle of attack flow," Renewable Energy, 2013; vol. 51, pp. 317-330.
Bazilevs, Y., et al.; "Fluid-structure interaction modeling of vertical-axis wind turbines," J. Appl. Mech., 2014, vol. 31, 081006-081006-8.
Buchner, A-J., et al.; "Dynamic stall in vertical axis wind turbines:Comparing experiments and computations," J. Wind. Eng. Ind. Aerodyn., 2015, vol. 146, pp. 163-171.
Dominy, R., et al.; "Self-starting capability of a Darrieus turbine," Proc. IME J. Power Energy, 2007, vol. 221, DOI: 10.1243/09576509JPE340.
Hill, N., et al.; "Darrieus turbines: the physics of self-starting," Proc IME J. Power Energy, 2009, vol. 223, pp. 21-29; DOI: 10.1243/09576509JPE615.
Nakajima, Miyoshi, et al.; "Performance of Double-step Savonius Rotor for Environmentally Friendly Hydraulic Turbine," Journal of Fluid and Science Technology, 2008, vol. 3, DOI:10.1299/jfst.3.410.
Kamoji, M.A. et al.; "Performance tests on helical savonius rotors," Renewable Energy, 2009, vol. 34, pp. 521-529.
Gupta, A. et al.; Computational fluid dynamics analysis of a twisted three bladed H-Darrieus rotor, J. Renew. Sustain. Energy, 2010, vol. 1; Article 043111.
Castelli, M.R., et al.; "Effect of blade inclination angle on a Darrieus wind turbine," J. Turbomachinery, vol. 134 (3) (2011), 031016-031016-10; Abstract Only.
Mohamed, M., "Impacts of solidity and hybrid system in small wind turbines performance," Energy, vol. 57 (2013), pp. 495-504.
Singh, M. et al.; "Investigation of self-starting and high rotor solidity on the performance of a three S1210 blade H-type Darrieus rotor," Renew. Energy, vol. 76 (2015), pp. 381-387.
Paraschivoiu, I., et al.; , "H-darrieus wind turbine with blade pitch control," Int. J. Rotating Mach., 2009 , pp. 1-7.
Ponta, F.L., et al.; "On the aerodynamics of variable-geometry oval-trajectory Darrieus wind turbines," Renewable Energy, 2007, vol. 32, pp. 35-56.
Mohamed, M.H.; "Optimization of Savonius turbines using an obstacle shielding the returning blade," Renewable Energy, 2010, vol. 35, pp. 2618-2626.
Mohamed, M.H.; "Optimal blade shape of a modified Savonius turbine using an obstacle shielding the returning blade," Energy Conversion and Management, 2011, vol. 52, pp. 236-242.
Damak, A., et al.; "Experimental Investigation of helical Savonius rotor with a twist of 180°," Renewable Energy, 2013, vol. 52, pp. 136-142.
R.J. Preen, et al.; "Toward the coevolution of novel vertical-Axis wind turbines," Trans. Evol. Comput., vol. 19 (2) (2015), pp. 284-294.
Irabu, Kunio, et al.; "Characteristics of wind power on Savonius rotor using a guide-box tunnel," Experimental Thermal and Fluid Science, 2007, vol. 32, pp. 580-586.
Altan, Burçin Deda, et al.; "An experimental and numerical study on the improvement of the performance of Savonius wind rotor," Energy Conversion and Management, 2008, vol. 49, pp. 3425-3432.
B.K. Debnath, et al.; "Computational fluid dynamics analysis of a combined three-bucket Savonius and three-bladed Darrieus rot," J. Renew. Sustain. Energy, 1 (3) (2009), Article 033110.
J. Gavaldà, et al.; "Experimental study on a self-adapting Darrieus—Savonius wind machine," Sol. Wind Technol., vol. 7 (4) (1990), pp. 457-461.
W. Kou, et al.; "Modeling analysis and experimental research on a combined-type vertical axis wind turbine," 2011 International Conference on Electronics, Communications and Control (ICECC), Ningbo, China (2011)—Abstract Dnly.
T. Wakui, et al.; "Hybrid configuration of Darrieus and Savonius rotors for stand-alone wind turbine-generator systems," Electr. Eng. Jpn., vol. 150 (4) (2005), pp. 259-266.
Y. Kyozuka, "An experimental study on the darrieus-savonius turbine for the tidal current power generation," J. Fluid Sci. Technol., vol. 3 (2008), pp. 439-449.
S. Bhuyan, et al.; "Investigations on self-starting and performance characteristics of simple H and hybrid H-Savonius vertical axis wind rotors—science direct," Energy Convers. Manag., vol. 87 (2014), pp. 859-867.
D.B. Araya, et al., "A comparison of wake measurements in motor-driven and flow-driven turbine experiments," Exp. Fluid, vol. 56 (7) (2015), p. 150.
C.S. Ferreira, et al., "2D PIV visualization of dynamic stall on a vertical Axis wind turbine," 45th AIAA Aerospace Sciences Meeting and Exhibit, Reno, Nevada (2007); Abstract Only.
M.R. Castelli, et al., "Modeling strategy and numerical validation for a Darrieus vertical Axis micro-wind turbine," ASME 2010 International Mechanical Engineering Congress & Exposition, Vancouver, British Columbia, Canada (2010).
H. Beri, et al.; "Double multiple stream tube model and numerical analysis of vertical Axis wind turbine," Energy Power Eng., vol. 3 (3) (2011), pp. 262-270.

* cited by examiner

Fine mesh

Medium mesh

Coarse mesh

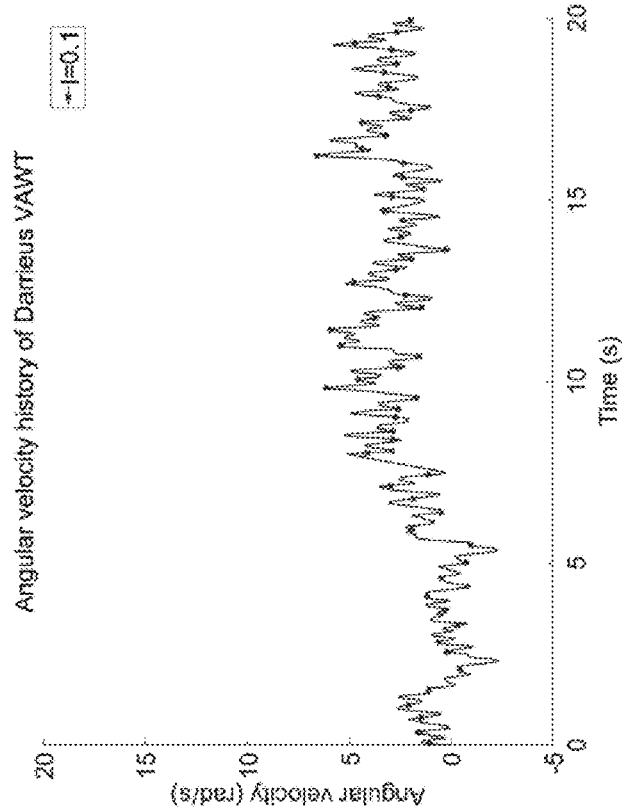
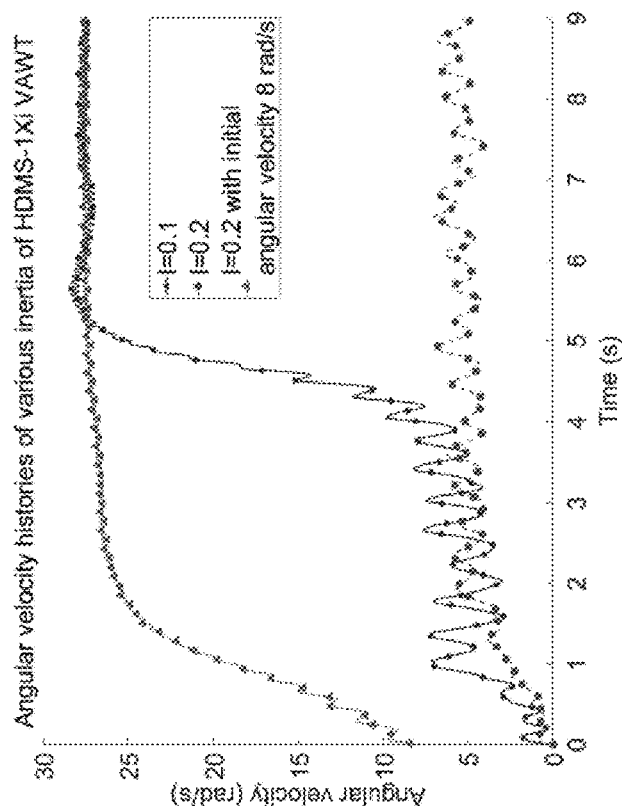
FIGURE 10(b)
FIGURE 10(a)

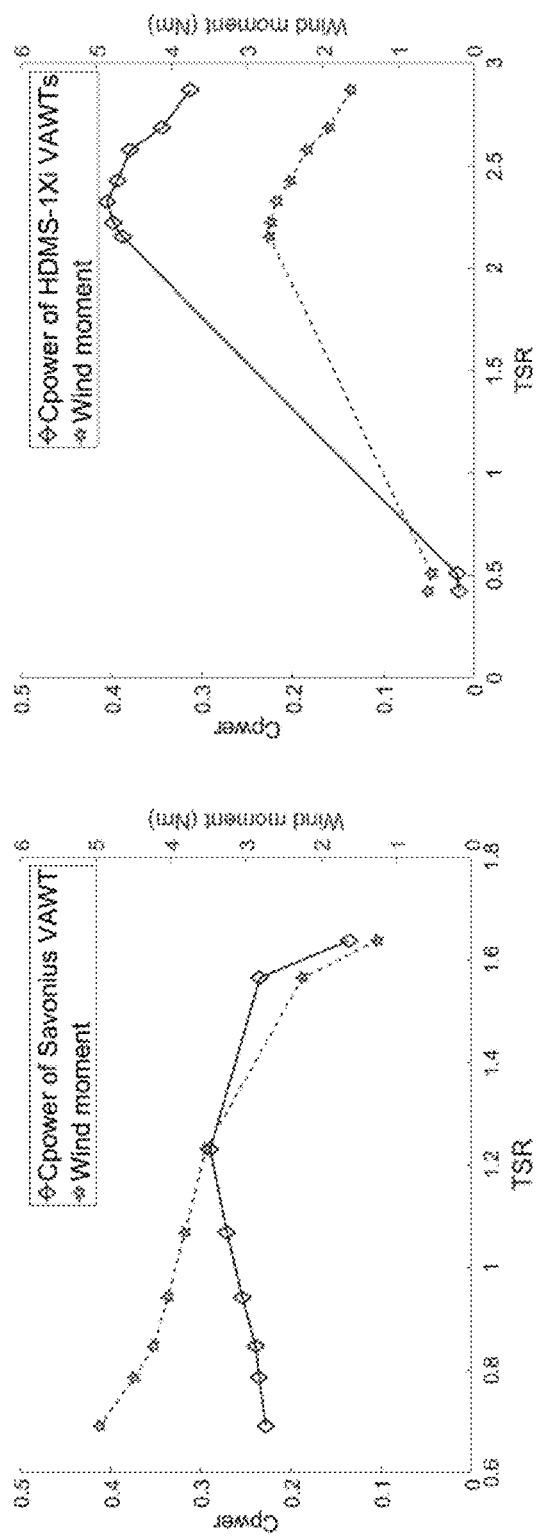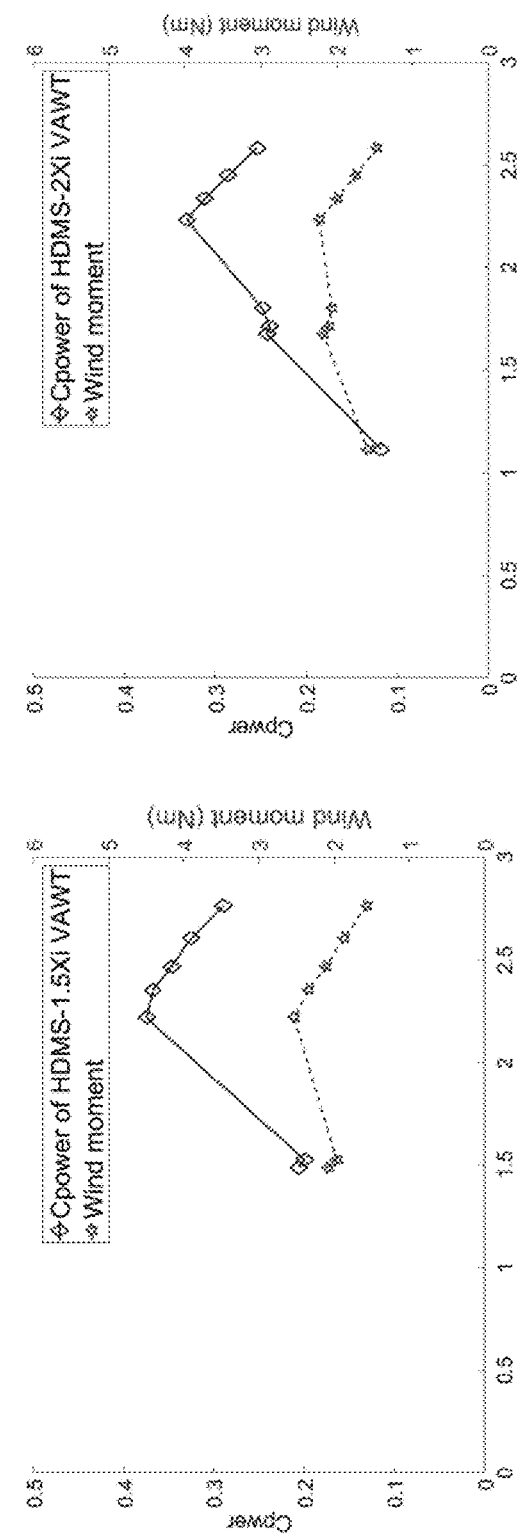
FIGURE 15(a)
FIGURE 15(b)
FIGURE 15(c)
FIGURE 15(d)

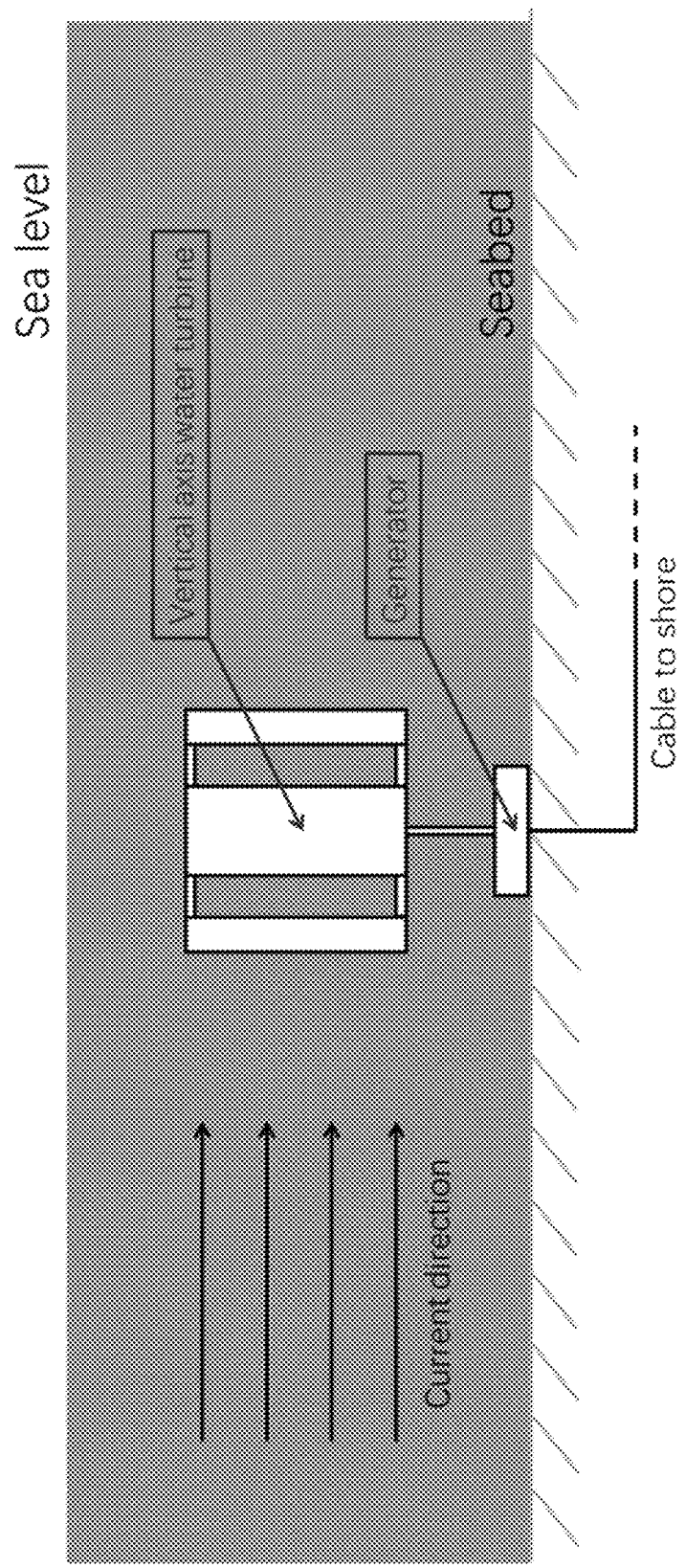

HYBRID VERTICAL AXIS TURBINE APPARATUS

CROSS REFERENCE TO RELATED APPLICATIONS

This application was filed under the provisions of 35 U.S.C. § 111(a) and claims priority to U.S. Provisional Patent Application No. 62/835,061 filed on Apr. 17, 2019 in the name of Meilin Y U, et al. and entitled "Windmaster," which was hereby incorporated by reference herein in its entirety.

BACKGROUND

The increasing levels of greenhouse gas emission and global warming due to the burning of fossil fuels have led to renewed interest in harvesting energy from renewable energy sources. Among several available renewable energy sources, wind energy has been a very popular alternative resource and was now one of the world's fastest growing energy resources. It was found from a series of work by Dabiri et al. [1]-[4] that the average energy density of modern wind farms was about 2-5 $W/m^2$ (watts per square meter), compared with 90 $W/m^2$ for a typical coal power plant. Despite the large energy density discrepancy, the wind energy was still attractive due to its renewable and clean energy feature and its ubiquity all over the world. Furthermore, the, energy density of modern wind farms was still far from their full capacity due to the sparse turbine distribution and long idle time. Therefore, the wind. energy harvesting technology needs to be further improved to enhance energy density in wind farms. In addition, due to growing urbanization, especially in developing countries [5], harvesting wind energy in urban environments has been attracting much research attention [6]. Due to highly unsteady and turbulent flow environments, more research was needed to enhance the performance, such as increasing power output and efficiency, and decreasing vibration and noise emission, of wind turbines to be deployed in urban areas.

Typically wind turbines are classified into horizontal axis wind turbines (HAWTs) and vertical axis wind (or water) turbines (VAWTs) depending on the direction of the axis of rotation. Though the utility-scale VAWTs are more commonly used in wind farms due to their higher power generation capacity than that of VAWTs, VAWTs have their own advantages over HAWTs. Specifically, they are omni-directional, indicating that they can operate under different wind directions without using complex yaw mechanism. They are usually less sensitive to wake effects compared to HAWTs [7]-[11]. Appropriately designed VAWTs can effectively harvest wind energy at both very low (e.g., ≤1 m/s) and very high (e.g., 25 m/s) wind speeds. These features make VAWTs potential candidates to be deployed in modem wind farms for energy density enhancement, and in complex urban flow environment for effective wind energy harvesting. Moreover, VAWTs usually have low noise emission and low radar signatures and are easy to install and maintain. As a result, VAWTs are attractive for deployment in both urban and rural areas, and in offshore regions [12],[13].

There exists a great degree of versatility in the design of VAWTs (see the recent comprehensive reviews [14]-[19] for more details). Traditionally, VAWTs can be classified into two dominant types, namely, Darrieus and Savonius type wind turbines. The Darrieus VAWT (see for example in FIG. 1(a)) is a lift-driven wind turbine, and usually has high energy harvesting efficiency at relatively large tip speed ratios (TSRs). As well-known in the art, "tip speed ratio" or "TSR" is defined as the ratio between the rotating speed at the tip of the rotor and the incoming wind speed. However, the Darrieus VTAWT suffers from self-starting issues due to the dead band of negative torque at small TSRs [20]-[24], although some authors have reported unaided start-up in a steady wind [25], [26]. The Savonius VAWT (see for example in FIG. 1(b)) falls into the category of drag-driven wind turbines. It is self-starting, and works well at small TSRs [27], [28], however, disadvantageously the energy harvesting efficiency is traditionally much lower than that of the Darrieus VAWT.

Much research has been performed in recent years to overcome the deficiencies of individual wind turbine designs. To improve the self-starting capability of the Darrieus VAWT, twisted and chambered blades can he designed [20], [29], [30]; the solidity of the VAWT can be increased [31], [32]; passive and active pitch control mechanism can he incorporated into the design [33]; and the blade trajectory can he modified, e.g., variable-geometry oval-trajectory Darrieus VAWT [34]. These modifications usually suffer from various side-effects, such as complicated shapes which are hard to manufacture, low energy harvesting efficiency, and complex control system which can significantly increase the operation and maintenance expenses. To increase the efficiency of the Savonius VAWT, the blade shape can be optimized or twisted [35]-[38], a shielding obstacle or curtain can be used to modify the pressure distribution over the blade [36], [39], [40]; and the Savonius design can be mixed with a Daniel's design [41]. These modifications suffer from similar side-effects as those for the Darrieus VAWT. The improved efficiency was usually much less than that of the Darrieus VAWT.

To overcome the deficiencies mentioned above from the two individual turbine designs, some researchers have developed combined Darrieus and Savonius wind turbine designs. For example, Gavalda et al. [42] proposed and analyzed a combined Darrieus-Savonius machine consisting of a two-half-cylinder Savonius rotor and a two-NACA0012-airfoil Darrieus rotor. It was reported that the maximum power coefficient could achieve 0.35. With further modification of the model, i.e., the Savonius rotor was stopped at high TSRs, the turbine was able to achieve a power coefficient of 0.40, But this value was still less than that of the original Darrieus rotor. Kou et al. [43] came up with a CT-SBVAWT (Combined Type Straight-Bladed Vertical Axis Wind Turbine) design with two orthogonal Savonius blades in the upper region and an H-blade configuration in the lower region of the turbine. It was found that the hybrid rotor configuration has a good starting characteristics and better energy utilization at higher flow speed. Wakui et al. [44] developed two types of configurations consisting of an eggbeater Darrieus turbine and a two-stage Savonius turbine. The Type-A hybrid turbine with the Savonius rotor in the center of the Darrieus one has a maximum power coefficient of 0.204 at TSR 3.51; and the Type-B hybrid turbine with the Darrieus rotor on top of the Savonius one has a maximum power coefficient of 0.231 at TSR 3.76. Since the height of the Type-B turbine was almost twice that of the Type-A turbine, they argued that if the height of the Type-A turbine was set the same as that of the Type B, then roughly twice the rated power output as Type B can be obtained from Type A. Therefore, they suggested that the Type-A configuration was more useful than Type-B due to its compactness and better electric power performance. Kyozuka et al. [45] combined a two-blade Darrieus rotor and a two-bucket Savonius rotor. Various attachment angles between two rotors have been tested to improve torque and power efficiency. Though the starting torque of the rotor increased, the power coefficient and rotor torque were decreased by 70%, as compared to a single Darrieus rotor. Bhuyan et al. [46] compared the self-starting characteristics of an H-rotor and a hybrid H-Savonious VAWT. They found that the hybrid design exhibits self-starting capability at all azimuthal positions.

None of these VAWT designs in the prior art can simultaneously resolve the technical challenges, including self-starting, high energy efficiency, and structural stability, at realistic wind and tidal speeds. Towards that end, the present invention broadly relates to a new hybrid Darrieus-Modified-Savonius (HDMS) VAWT apparatus. In the HDMS VAWT design, an MS rotor was located in the center of a straight-bladed H-type Darrieus rotor to simultaneously enhance the self-starting capability, using the MS rotor, and maintain high energy harvesting efficiency, using the Darrieus rotor. The multi-stage HDMS VAWT can harvest aero-hydro energy efficiently under a wide range of flow conditions, while also providing good self-starting properties and enhanced structural stability.

SUMMARY

In one aspect, a hybrid vertical fluid turbine apparatus is described, said apparatus comprising:
(a) a first rotor system positioned in a central region and rotatable about a central axis, wherein the first rotor system comprises:
  (i) at least two blade-sets stacked vertically along the central axis, each blade-set comprising a plurality of first blades that are equiangularly spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
  (ii) a hydraulic brake system that is mounted upon the shaft with bearings; and
(b) a second rotor system positioned in an annular region surrounding the first rotor system in the central region, wherein the second rotor system comprises a plurality of second blades equiangularly spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

In another aspect, a method of using the hybrid vertical fluid turbine apparatus is described, said method comprising using the hybrid vertical fluid turbine apparatus to convert potential energy of wind to mechanical/rotational energy and eventually to electrical energy.

In still another aspect, another method of the hybrid vertical fluid turbine apparatus is described, said method comprising using the hybrid vertical fluid turbine apparatus to convert potential energy of water in a body of water to mechanical/rotational energy and eventually to electrical energy.

Other aspects, features and embodiments of the invention will be more fully apparent from the ensuing disclosure and appended claims.

BRIEF DESCRIPTION OF THE FIGURES

FIG. 10(a) shows the history of the angular velocity for the HDMS-1Xi VAWTs under free load.
FIG. 10(b) shows the history of the angular velocity for the Darrieus VAWT under free load.

FIG. 15(a) shows the power coefficient and wind moment as functions of TSR for the MS VAWT.

FIG. 15(b) shows the power coefficient and wind moment as functions of TSR for the HDMS-1Xi VAWT.

FIG. 15(c) shows the power coefficient and wind moment as functions of TSR for the HDMS-1.5Xi VAWT.

FIG. 15(d) shows the power coefficient and wind moment as functions of TSR for the HDMS-2Xi VAWT.

FIG. 23 is a schematic diagram of tidal energy harvesting, wherein the HDMS VAWT is positioned vertically relative to the surface plane of the body of water.

DETAILED DESCRIPTION, AND PREFERRED EMBODIMENTS THEREOF

Figure 1A:
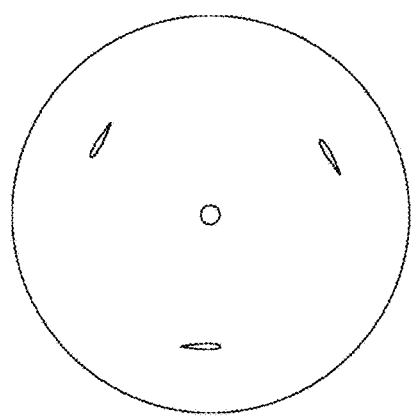
FIG. 1(a) was a schematic of a 2D Darrieus-type VAWT.
Figure 1B:
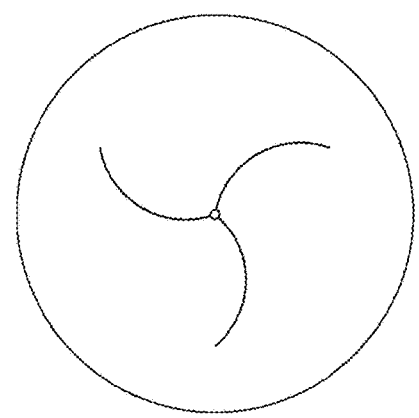
FIG. 1(b) was a schematic of a 2D MS-type VAWT.

The current invention relates to a hybrid VAWT turbine design that can overcome the dead band of negative torque at small TSRs and maintain high power coefficients comparable with the Darrieus VAWT at large TSRs. This hybrid VAWT comprises a modified-Savonius (MS) rotor in the central region and a straight bladed H-type Darrieus rotor in the surrounding annular region (see FIGS. 1(c) and (d)), referred to hereinafter as the hybrid Darrieus-Modified-Savonius (HDMS) VAWT.

The HDMS VAWT described herein can be used to harvest energy using any fluid motion, including water and air motion (i.e., wind).

As introduced hereinabove, the present invention broadly relates to a hybrid VAWT (HDMS VAWT) comprising a modified-Savonius (MS) rotor in the central region and a Darrieus rotor in the surrounding annular region. The hybrid design represents a nonlinear interaction between the MS rotor and the Darrieus rotor.

With regards to the MS rotor 10 in the central region, said MS rotor comprises a plurality of blade-sets 140 or stages, stacked upon one another and rotatable about a common, central axis, wherein each blade-set comprises a first (i.e., top) and second (i.e., bottom) circular plate 100, each plate being substantially perpendicular to the common axis. The common axis is transverse to the flow of the fluid medium. Each blade-set or stage comprises a plurality of rectangular blades or sails 110, each of which is substantially the same size, emanating from the common axis and rigidly attached to the first and second circular plates. For example, the blade-set can comprise two, three, four, or more blades or sails. In a preferred embodiment, the blade-set comprises three blades or sails arranged approximately 120 degree angles from each other around the common axis. Each rectangular blade has a blade length and a blade height, wherein the blade height is equal to the distance between the first and second circular plates in the blade-set. Each blade in the blade-set is attached along the blade length to the first and second circular plates from the common axis to a position proximate to an edge of the circular plates, wherein the blade length is greater than the radius of the circular plates, such that the blade has to be bent or arced along the blade length to fit. In one embodiment, the blade length is about 20% to 60% longer than the radius of the circular plate, preferably about 40% to about 60%. It should be appreciated that an edge of each blade may be aligned with an edge of the circular plates, or an edge of each blade may be inset a nominal distance from the edge of the circular plates.

Each blade-set is rotated relative to the next blade-set such that the concavity of the second blade set is behind that of the first. For example, the second blade-set is rotated approximately 20-60 degrees from the first, and the third is still another approximately 20-60 degrees behind the second or approximately 40-120 degrees behind the first. It should be appreciated by the person skilled in the art that the MS rotor of the apparatus can comprise one, two, three, four, five, or more blade-sets, and that each blade-set can have substantially the same, or different, height relative to another blade-set. Further, each blade-set can comprise the same number, or a different number, of blades as the other blade-sets making up the MS rotor portion of the HDMS VAWT. The MS rotor in the central region can be built in either clockwise or anti-clockwise parities. In a preferred embodiment, the common axis comprises a shaft. The shaft can be static, with the overall blade-set assembly mounted upon and rotating about the non-rotating shaft on bearings or bushings. Alternatively, the shaft can be rotatable, wherein the blade-set assembly is attached to the rotatable shaft, and the rotating: shaft rotates about the central axis, as understood by the person skilled in the art. The MS rotor can comprise a brake system, for example a hydraulic brake system, that is mounted upon the shaft with bearings to limit the rotational speed of the rotor assembly to a maximum speed at high wind/fluid speeds, as readily determined by the person skilled in the art.

It should be appreciated that although the MS rotor portion of the HDMS VAWT was disclosed as comprising a first and second circular plate per plate-set, one plate-set can share a circular plate with another plate-set, for example, the second plate of a first blade-set can be the first plate of a second blade-set. Further, it is contemplated that instead of using a full circular plate that the arcuate portions of the blades can instead be "capped" 150 off instead, for example as illustrated in FIG. 1(*e*), which is a top view of a set of MS blades 110 of a blade-set. It should be appreciated that there can be one or two caps associated with the arcuate portions of the blades of a blade-set, meaning that only the top of the blades are capped, only the bottom of the blades are capped, or both the top and the bottom of the blades are capped, depending on the achievement of the greatest harvesting efficiency.

With regards to the Darrieus rotor 20 in the surrounding annular region, preferably the Darrieus rotor is a straight bladed H-type Darrieus rotor, although it should be appreciated that a helical-type and the semicircular-type Darrieus rotor is contemplated for use in the HDMS VAWT disclosed herein. The straight-bladed H-type Darrieus rotor comprises a plurality of blades 120 that can rotate about the common axis. The cross-section of the blade 120 is of a substantially symmetrical airfoil shape, although non-symmetrical airfoil blade shapes can be used. For example, a NACA 0015 airfoil blade design has generally a wide, round leading edge and a squat parabolic length in cross-section and is defined in part by a chord length, c. It should be appreciated that the shape of the airfoil blades can be adjusted as needed depending on the given wind power generation requirements, as readily understood by the person skilled in the art. The plurality of blades is rigidly held in a position substantially parallel to the common axis. In one embodiment, each blade is attached to the blade-sets of the MS rotor using a plurality of supporting struts 130. Each blade is preferably positioned substantially equiangular around the common axis. The Darrieus rotor of the HDMS VAWT can comprise two, three, four, or more blades positioned around the common axis.

As shown in FIG. 1(*d*), the Darrieus rotor blades 120 are not the same longitudinal length (along the common axis) as the cumulative length of the three blade-sets 140. FIG. 1(*d*) is not intended to limit the instant invention in any way; there may be more or less than three blade-sets 140, more or less than three blades 110 per blade-set 140, more or less than three Darrieus rotor blades 120, and the length of the Darrieus rotor blades 120 can be the more or less than the cumulative length of the blade-sets of the MS rotor portion, as readily understood by the person skilled in the art. Preferably, the MS rotor portion and the Darrieus rotor portion are both arranged such that they are symmetrical around the common axis.

Figure 1C:
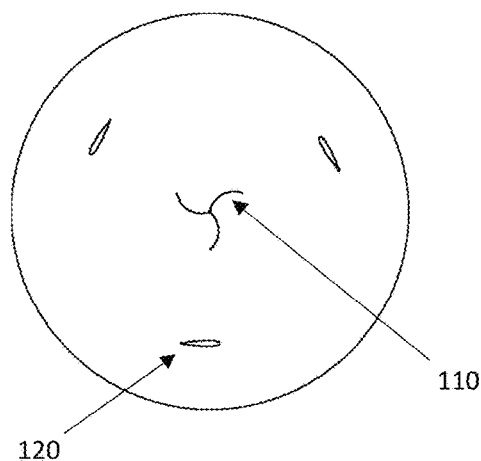
FIG. 1(c) was a schematic of a 2D HDMS-type VAWT.
Figure 1D:
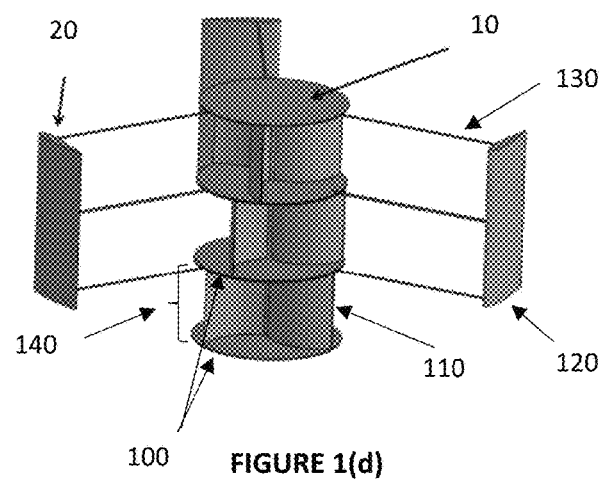
FIG. 1(d) was a schematic of a 3D model of the IMMS-type VAWT.
Figure 1E:
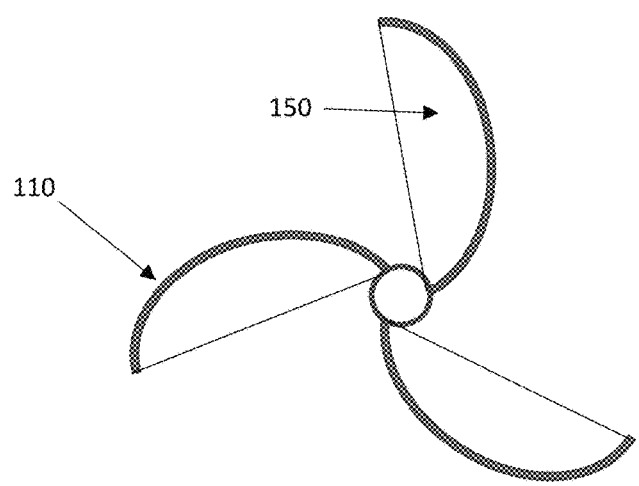
FIG. 1(e) illustrates a top view of an alternative to using a full circular plate, instead capping just the arcuate portions of the blade.
Figure 2:
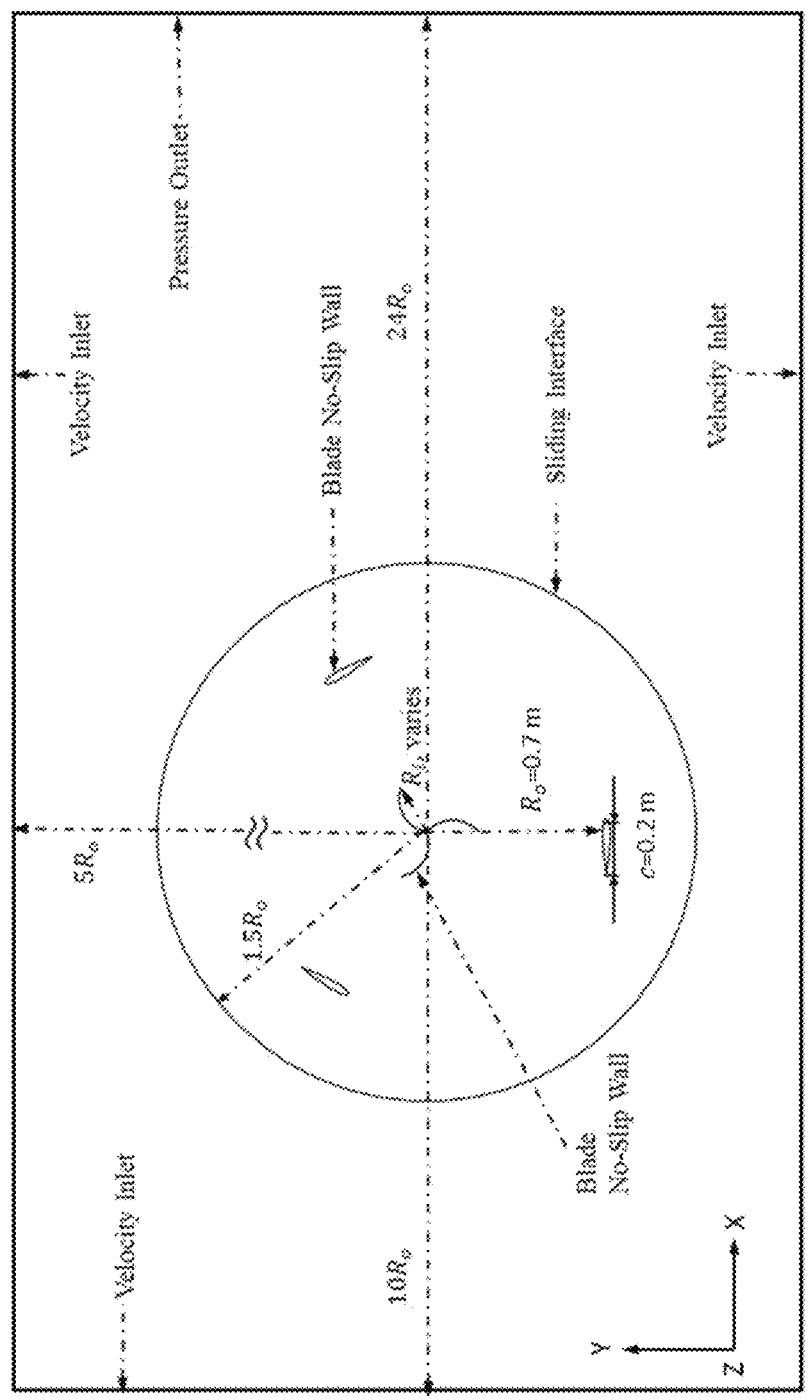
FIG. 2 was a schematic illustration of the computational domain and boundary conditions.

An embodiment of the HDMS VAWT is shown in FIG. 2, wherein the tip of the blade 110 in the MS rotor (wherein the blade intersects with the edge of the circular plates) was aligned with an aerodynamic center of the corresponding blade 120 in the Darrieus rotor. It should be appreciated that the relative position between a blade of the inner MS rotor and a blade of the outer Darrieus rotor can be adjusted relative to that illustrated in FIG. 1(*d*), for example in a range of +/−1°-90° relative to the alignment with the aerodynamic center of the Darrieus blade, as readily determined by the person skilled in the art. The ratio of the radius $R_o$ of the Darrieus rotor blades 120 relative to the radius $R_i$ of the MS rotor blades 110 is in a range from about 1.5 to about 4, preferably about 1.5 to about 3.5, and even more preferably about 2.5 to about 3.5. The ratio of the radius $R_o$ of the. Darrieus rotor blades 120 relative to the chord length, c, of the Darrieus blades is in a range from about 1.5 to about 4, preferably about 1.5 to about 3.5, and even more preferably about 2.5 to about 3.5. In one embodiment, the radius R, of the MS rotor blades 110 is substantially the same as the chord length, c, of the Darrieus blades. In another embodiment, the radius $R_i$ of the MS rotor blades 110 is greater than the chord length, c, of the Darrieus blades. In still another embodiment, the radius R of the MS rotor blades 110 is less than the chord length, c, of the Darrieus blades. The preferred radius $R_i$ of the MS rotor blades relative to the chord length, c, of the Darrieus blades is dependent on when the energy harvesting efficiency is maximized, as readily determined by the person skilled in the art. In a preferred embodiment, the energy harvesting efficiency is achieved at TSR values greater than about 1.5, preferably greater than about 2.0, and most preferably greater than about 2.2.

Preferably, each HDMS VAWT comprises suitable self-lubricating bushings (not shown) (e.g., bearings) to help reduce rotational friction, vibration, and noise. A suitable alternator, such as, for example, a direct drive permanent magnet alternator can be used to collect and convert the "rotational energy" power of fluid, as harnessed by the present HDMS VAWT, into electrical energy, as readily understood by the person skilled in the art. The components of the HDMS VAWT comprise at least one of carbon composites, aluminum, and polymer materials, although other materials are contemplated. As defined herein, "bearings" include at least one of ball bearings, air bearings, and magnetic levitation bearings. An embodiment of how the MS rotor portion of the HDMS VAWT can be found in U.S. Pat. No. 8,790,069 in the name of Bruce Elliott Anderson, which is hereby incorporated in its entirety herein.

Accordingly, in a first aspect, a hybrid vertical fluid turbine apparatus is disclosed, said apparatus comprising:
 (a) a first rotor system positioned in a central region and rotatable about a central axis, wherein the first rotor system comprises:
  (i) at least two blade-sets stacked vertically along the central axis, each blade-set comprising a plurality of first blades that are equiangularly spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
  (ii) a hydraulic brake system that is mounted upon the shaft with bearings; and
 (b) a second rotor system positioned in an annular region surrounding the first rotor system in the central region, wherein the second rotor system comprises a plurality of second blades equiangularly spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

With regards to the first rotor system, in a preferred embodiment, each blade-set comprises a circular top plate and a circular bottom plate, wherein the circular plates are substantially perpendicular to the central axis, and wherein the plurality of first blades are positioned therebetween. In one embodiment, one plate-set can share a circular plate with another plate-set. Each blade-set can comprise three first blades located at approximately 0 degrees, 120 degrees, and 240 degrees about the central axis. Each first blade is rectangular and has a first blade length and a first blade height, wherein the first blade height is equal to the distance between the circular top and bottom plates in the blade-set. Each first blade in the blade-set is attached along the first blade length to the top and bottom circular plates from the central axis to a position proximate to an edge of the circular plates, wherein the first blade length is greater than the radius of the circular plates, such that each first blade has to be bent or arced along the first blade length to fit, resulting in the concave shape, upon rigid positioning in the blade-set. An edge of each first blade may be aligned with an edge of the circular plates, or an edge of each first blade may be inset a nominal distance from the edge of the circular plates. and wherein the first blade length is greater than a radius of the circular top and bottom plates. The first blades in each blade-set are offset about 20-60 degrees about the central axis from the first blades in each other blade-set. With regards to the second rotor system, the plurality of second blades are straight-bladed. The shaft can be a static non-turning shaft, and the first rotor system is mounted upon, and rotates around, the static non-turning shaft. Alternatively, the shaft can be a rotating shaft, and the first rotor system is attached to the rotating shaft, and the rotating shaft rotates about the central axis. Preferably, the greatest energy harvesting efficiency is achieved at a tip speed ratio (TSR) values greater than about 2.0, preferably greater than 2.2.

Vertical axis wind turbines (VAWTs) provide promising solutions for wind energy harvesting in complex flow environments. However, it is challenging to guarantee satisfactory self-starting capability and high power efficiency simultaneously in a VAWT design. To address this challenge, the new hybrid Darrieus-Modified-Savonius (HDMS) VAWT was designed and numerically tested using a fluid-structure interaction approach based on high fidelity computational fluid dynamics. A systematic study was conducted to analyze the effects of the moment of inertia, turbine structure, and external load on the self starting capability and power efficiency. It was found that compared with the Darrieus VAWT, the HDMS design has better self-starting capability due to the torque provided by the MS rotor at small tip speed ratios (TSRs). The larger the MS rotor was, the better the self-starting capability is. However, there was a penalty on power efficiency when the size of the MS rotor increased. With an appropriately sized MS rotor, the HDMS design can be self-starting and maintain high power efficiency comparable with the Darrieus VAWT at large TSRs. The key flow physics is that the HDMS design can keep accelerating at small TSRs due to the inner MS rotor, and can suppress dynamic stall on the Darrieus rotor at large TSRs. Advantageously, the HDMS VAWT apparatus described herein was able to achieve high power efficiencies without the need for variable-geometry oval-trajectory, twisted, or chambered Darrieus blades and without the need for a shielding curtain to modify the pressure distribution over the blade.

Advantageously, it was surprisingly discovered that an MS rotor with an appropriate size, when mounted in the center of a Darrieus rotor, to yield the hybrid VAWT turbine design described herein, can enhance the self-starting capability of the wind turbine system, and facilitate its acceleration to a large TSR, thus maintaining a relatively high energy harvesting efficiency under external load. Other advantages discussed herein include, but are not limited to:

(a) The MS VAWT has better self-starting capability compared with the Darrieus one, especially at low wind speed. Using this information, it was thought that the inner MS rotor can enhance the self-starting capability of the HDMS VAWT. The larger the size of the inner MS rotor is, the better the observed self-starting performance. However, the inner MS rotor can also adversely affect the final angular velocity of the VAWTs. Specifically, the rotation speed that the HDMS VAWTs can reach at the end of acceleration decreases when the size of the inner MS rotor increases;

(b) For a given moment of inertia that supports self-startup under free load, the final angular velocity of both MS and HDMS VAWTs under external load decreases when the damping factor increases. For the HDMS-1Xi VAWT (i.e., the original HDMS design to be discussed hereinafter), when the damping factor exceeds a certain value, its performance was severely deteriorated due to the dynamic stall on the Darrieus rotor. However, when the size of the inner MS rotor increases, the sudden performance deterioration will be mitigated. Instead, the energy harvesting efficiency of the HDMS VAWTs under external load can be enhanced by the inner MS rotor;

(c) For each type of VAWTs studied, there exists an optimum damping factor which can result in the maximum power coefficient. It was found that for the MS VAWT, the best energy harvesting performance was achieved at a small TSR (i.e., around 1.2); while for all HDMS wind turbines tested in this study, the best energy harvesting performance was achieved at a larger TSR about 2.3. The maximum power coefficient of the HDMS-1Xi VAWT (41%) was about 13% higher than that of the MS VAWT (28%). For the HDMS-1.5Xi and HDMS-2Xi VAWTs, the maximum power coefficients are 37.5% and 33%, respectively;

(d) From a measurement of the aerodynamic moment acting on different components of the HDMS VAWTs, it was found that the energy was harvested mainly by the Darrieus blades when the turbines work at the optimum TSR. The wind moment acting on the inner MS rotor increases when its size increases; while at the same time, the wind moment acting on the Darrieus blades significantly decreases due to the interaction between the MS and Darrieus blades. This results in a drop of the total energy harvest efficiency;

(e) Compared with the 2D results, energy harvesting performance of the HDMS VAWTs, when evaluated using 2.5D LES, was reduced due to the large flow separation over the Darrieus blades;

(f) Preliminary simulation research findings indicate that the HDMS VAWT described herein can continuously harvest wind energy in a wide range of wind speeds (e.g., 1 m/s to 25 m/s), all while providing excellent self-starting capability. For example, the energy harvesting efficiency at wind speeds of 5 m/s to 10 m/s, can achieve a peak of about 60-80% of the Betz limit;

(g) The HDMS VAWT disclosed herein has enhanced stability, even at high wind speeds, due to the added stiffness by the inner modified Savonius rotor. The HDMS design can reduce structural vibration, thus leading to longer turbine operating lifetime.

Accordingly, in a second aspect, the present invention relates to a method of using the hybrid vertical fluid turbine apparatus of the first aspect to convert the potential energy of wind to mechanical/rotational energy and eventually to electrical energy. It should be appreciated that the common central axis of the HDMS VAWT can be arranged to be vertical or horizontal, relative to any surface, for example, the ground or structure, that the apparatus is being placed on.

In a third aspect, the present invention relates to a method of using the hybrid vertical fluid turbine apparatus of the first aspect to convert the potential energy of water in a body of water to mechanical/rotational energy and eventually to electrical energy. As defined herein, a "body of water" includes, but is not limited to, a bay, a bayou, a canal, a channel, a cove, a creek, a delta, an estuary, a fjord, a gulf, a harbor, an inlet, a lake, a mill pond, an ocean, a pond, a reservoir, a river, a sea, a sound, a strait, a stream, and a tide. It should be appreciated that the common central axis of the HDMS VAWT can be arranged to be vertical or horizontal, relative to the surface plane of the body of water.

Generally, harvesting water energy is similar to harvesting wind energy. For example, referring to the schematic diagram shown in Error! Reference source not found, it can be seen that the vertical axis water turbine can be substantially immersed in a body of water and the current will drive the turbine to rotate to generate mechanical/rotational energy. This mechanical energy can be converted to electrical energy using a generator.

In one embodiment of the third aspect, tidal current energy is harvested using the HDMS VAWT of the first aspect. The commercialization potential for tidal energy is larger than that for other ocean energy since it can be almost perfectly forecasted over a long-time horizon and is hardly influenced by weather conditions [59]. Energy can be generated both day and night. However, state-of-the-art tidal energy devices (TEDs) can only harness tidal energy with high current speeds (>2.25 m/s) [60], [61]. There are vast but untapped tidal energy resources with lower tidal current speeds (1.0~1.5 m/s) along the U.S. continental shelf edge. If a high-efficiency TED for low tidal current speeds can be provided, more than 70% of the US sea regions can be used for tidal energy generation [62]. The HDMS VAWT described herein will provide improved turbine efficiency, leading to a significant increase in energy yield. In one embodiment, the HDMS VAWT technology described herein is used to harvest hydrokinetic energy at low tidal current speeds.

The total tidal current power has a cubic relation with the tidal current speed: $P=0.5\rho AV^3$, where $\rho$ is water density, A is the swept area of the turbine, and V is the horizontal tidal current speed. Tidal current turbines start working when the tidal current speed reaches a minimum speed referred to as the "cut-in speed" and continuously generate electricity up to a specific tidal current speed referred to as the "rated" speed, where the maximum power is produced by the generator.

The basic principles of wind and tidal energy harvesting with vertical axis turbines (VATs) share the same general mechanism: convert kinetic energy of fluids into mechanical energy via fluid-structure interaction. The energy conversion efficiency has a theoretical upper limit, i.e., the Betz limit (59.3%), meaning at most 59.3% of the fluid kinetic energy (defined as $(\rho AV^3)/2$, where $\rho$ is the fluid density, A is the frontal area of the turbine, and V is the fluid velocity) can be extracted from unconfined fluid flows. Based on the fact that the energy density $\rho V^3$ in air (wind) and water (tide current) can be very similar and the Reynolds number (defined as $Re=VL/\nu$, where L is a characteristic length) of the flow over a wind turbine is almost the same as that of a water turbine of the same size, theoretically, the aerodynamic design of VAWTs can be very similar with the hydrodynamic design of vertical-axis tidal turbines (VATTs).

Figure 25:
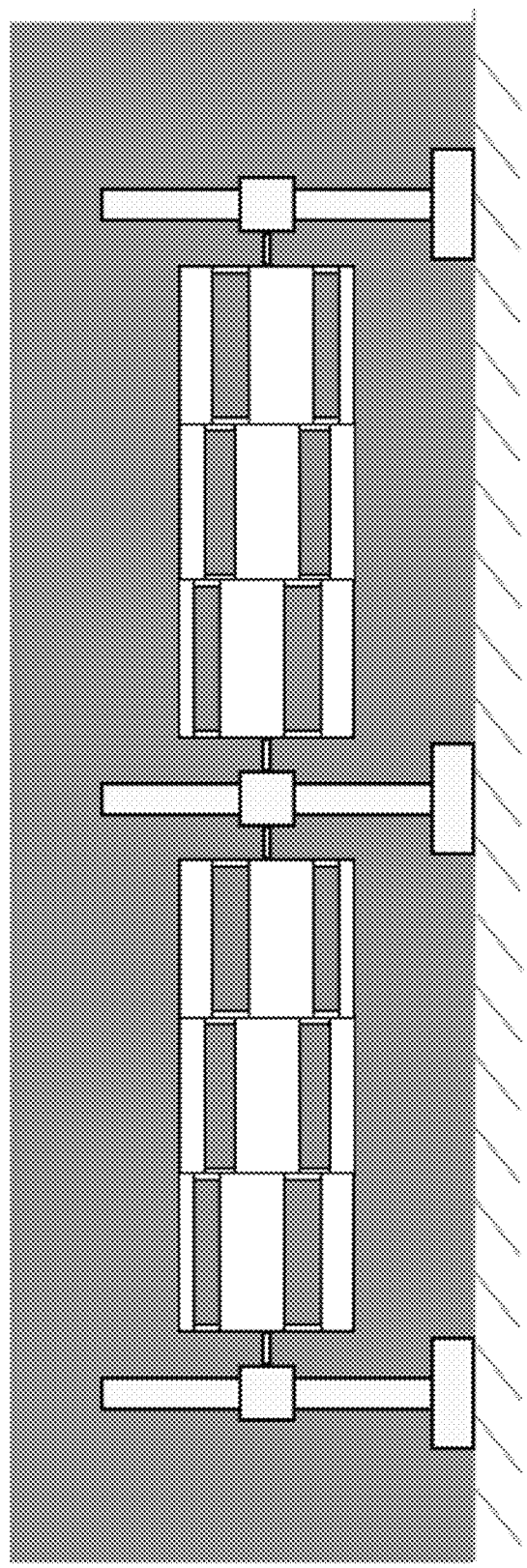
FIG. 25 is a schematic of a proposed arrangement of a plurality of HDMS VAWT apparatuses in a "fence."

FIG. 25 is a schematic of a proposed arrangement of a plurality of HDMS VAWT apparatuses in a "fence," wherein each HDMS VAWT is separated from the other ones by a post. This is advantageous when the HDMS VAWT apparatus is positioned horizontally relative to the surface plane of the body of water, a building or any other surface such as the ground. The number of posts can be minimized, and the posts can be used to incorporate at least some of the mechanisms needed to convert the rotational energy to electrical energy. Preferably, the posts are substantially water resistant.

The features and advantages of the invention are more fully illustrated by the following non-limiting examples, wherein all parts and percentages are by weight, unless otherwise expressly stated.

EXAMPLES

To investigate the aerodynamic properties of the HDMS design described herein, a coupled fluid-structure interaction (FSI) approach based on high fidelity computational fluid dynamics (CFD) was utilized. The present inventors noticed that most research on wind turbine aerodynamics were carried out by prescribing the motion of the VAWT at a constant angular velocity [22], [24]. This approach can be used to study the unsteady aerodynamics of VAWTs during their steady operation. However, it cannot account for flow physics during the starting stage of wind turbines. To investigate the self-starting performance of wind turbines, the wind-driven motion approach was needed [23], [44], [48]. To verify and validate the numerical method, mesh independence study, time step independence study, and comparison with previous numerical and experimental results were performed. Different configurations of the HDMS design, including the size and alignment of the inner MS rotor, were investigated numerically, and their impact on aerodynamic performance was quantified. The self-starting capability of the Darrieus and FIDMS VAWTs without external load was compared and analyzed. The energy harvesting efficiency of the MS and HDMS VAWTs under external load was also studied, and the corresponding aerodynamic phenomena considered. After that, the aerodynamic equivalence between the prescribed motion approach and the wind-driven approach was confirmed when the VAWT was under its stable operation status. Several tests with the prescribed motion were performed to study the impact of inner MS rotors on the aerodynamic performance of HDMS VAWTs. The differences in turbine performance predicted by 2D URANS and 2.5D LES were quantified. The observations on the numerical behaviors of URANS and LES are consistent with those from previous studies [22].

Example 1

Computational Models and Simulation Setup

In Example 1, numerical methods and simulation setup are introduced. Verification and validation of the computational model was also presented in this section.

1.1 Computational Models of VAWTs

Two dimensional (2D) computational models of VAWTs were used to analyze key flow physics in wind turbine flows. Specifically, three types of VAWTs, namely, Darrieus-type, MS-type and HDMS-type VAWTs, as shown in FIGS. 1(a)-1(d), were studied. These 2D turbine profiles can be regarded as models of three dimensional (3D) VAWTs with a large height-radius ratio (or aspect ratio), for which the effects of tip vortices can be neglected. Although small-scale flow details are neglected, 2D models can capture the large-scale dynamic behaviors of unsteady vortices and their interaction with the rotor blades. As demonstrated by many researchers ([8], [10], [49]-[54]) and the comparison of our results with previous experimental and numerical results (see, 1.4 below), 2D models can predict the efficiency and aerodynamic behaviors of VAWTs reasonably well with reduced computational cost.

In the Darrieus-type VAWT (see FIG. 1(a)), the three-bladed H-shaped rotor has a radius of R=0.7 m. A modified NACA0015 airfoil with a round trailing edge and a chord length of c=0.20 m [55] was used as the blade profile for this rotor. In the three-bladed MS rotor (see FIG. 1(b)), blades with specially designed curvature [47] are attached to a shaft and are 120° apart from each other. The radius of the MS rotor was also set as 0.7 m. The IMMS turbine comprises the three-bladed Darrieus H-shaped rotor and the three-bladed MS rotor. In the original design (see FIG. 1(c)), hereinafter the 1-IDMS-1X.i, the Darrieus rotor has a radius $R_o$ of 0.7 m and the MS rotor has a radius $R_i$ of 0.2 m. The tip of the blade in the MS rotor was aligned with the aerodynamic center of the corresponding blade in the Darrieus rotor (see FIG. 2). In FIG. 2, the computational domain and boundary conditions are illustrated as well.

Numerical simulations of different rotors driven by wind have been conducted under wind speed at 5 m/s. To measure the performance of VAWTs, several parameters, namely, angular velocity $\dot{\theta}$, aerodynamic moment $M_{wind}$, and power coefficient $C_{power}$, were used in this study.

Note that after obtaining the aerodynamic moment $M_{wind}$ and the angular velocity $\dot{\theta}$ of the wind turbine, the power extracted from wind was calculate as follows:

$$P = M_{wind}\dot{\theta}. \quad (1)$$

The total power in the incoming wind passing across the turbine with a reference area A can be calculated using the following formula $$P_{max} = \tfrac{1}{2}\rho U_\infty^3 A. \quad (2)$$

Finally, the power coefficient $C_{power}$ was calculated as $$C_{power} = \frac{P}{P_{max}}. \quad (3)$$

Based on Betz's law, the maximum value of the power coefficient $C_{power}$ was 59.3% in an open flow [56].

1.2 Numerical Framework of Fluid-Rigid-Body Interaction

The governing equations of fluid flow are the unsteady Reynolds-averaged Navier-Stokes (URANS) equations. In this example, the turbulence model was selected as the Spalart-Allmaras (S-A) model. The URANS was simulated using the ANSYS FLUENT 15.0 high-performance computing (HPC) software. To achieve wind-driven simulation, the flow solver was coupled with the kinematics equation which was specified in the User Defined Functions (UDFs). The sliding mesh model was used to accommodate the mesh motion. The wind turbine kinematics was modeled as follows.

Assume that the VAWT was rigid, and only rotates with respect to its central axis. The governing equation of wind turbine kinematics was expressed as $$\ddot{\theta} = M_{wind} + M_{load}. \quad (4)$$

wherein, I was the moment of inertia, was the angular acceleration, $M_{wind}$ was the aerodynamic moment, and $M_{load}$ was the external load. For practical wind engineering application, the external load can be an intricate function of the angular velocity $\dot{\theta}$ and/or acceleration $\ddot{\theta}$ of the turbine. In this study, a linear relationship between $M_{load}$ and $\dot{\theta}$ was assumed, namely, $M_{load} = -C\dot{\theta}$, where C was the damping factor. Thus, Eq. (4) can be rewritten as $$\ddot{\theta} + C\dot{\theta} = M_{wind}. \quad (5)$$

Note that in the ANSYS FLUENT software, $M_{wind}$ was calculated from the flow solver as $M_{wind} = \tfrac{1}{2}C_m\rho U_\infty^2 AL$, where $C_m$ was the moment coefficient, $U_\infty$ was the free stream velocity, A was the reference area, and L was the reference length.

After specifying the governing equations of the fluids and the rigid-body motion of the turbine, the fluid-structure interaction approach was developed as follows. After the fluid flow was simulated with the flow solver, the aerodynamic moment $M_{wind}$ in Eq. (4) was available. The angular displacement θ of the VAWT can then be calculated from Eq. (5). This will provide new boundary conditions for the flow solver, which will be solved again to obtain new aerodynamic moment. This completes the coupling between fluid flow and wind turbine kinematics.

1.3 Simulation Setup

As mentioned previously, the S-A turbulence model was used in all URANS-based flow simulations presented in this study. For the pressure-velocity coupling, the Semi-Implicit Method for Pressure-Linked Equations (SIMPLE) algorithm with a second-order upwind spatial discretization scheme was utilized to solve the RANS equations. A second-order implicit transient formulation was selected to ensure the accuracy of time integration. The inlet turbulence viscosity ratio was set to 10 to give a reasonable estimation of the freestream turbulence. Additionally, for each inner-iteration, the residual convergence criterion was fixed at $10^{-5}$ for better converged results. For all the wind-driven simulations, the Reynolds number based on the diameter of the VAWT was approximately $4.9\times10^5$. The numerical setup was summarized in Table 1.

TABLE 1

Summarization of simulation parameters.

| Input Variable | Value/Setting |
| --- | --- |
| Turbulence Model | S-A |
| Pressure velocity coupling | SIMPLE |
| Spatial discretization scheme | Second-order upwind |
| Time integration | Second-order implicit |
| Inlet turbulence viscosity ratio | 10 |
| Convergence criterion for residuals | $10^{-5}$ |
| Reynolds number | $4.9 \times 10^5$ |

For wind-driven simulation, the following strategies were adopted to set up initial conditions. As a first step, the damping factor C was set to zero. This indicates that at the starting stage, there was no damping force acting on the VAWT. When the angular velocity of the VAWT achieves a statistically stable (e.g., periodic) value, the damping effect will be added to the turbine (see, FIG. 16). Note that when there was no damping effect, no wind energy will be extracted from the blowing wind (except the energy collected to accelerate the VAWT during the startup stage). When the damping effect (i.e., energy harvesting mechanism) was added to the VAWT, the aerodynamic torque was generated to overcome the resistance originated from the energy harvesting mechanism. As a result, the turbine system starts to harvest energy from the wind.

1.4 Verification and Validation of the Numerical Setup

Figure 3A:
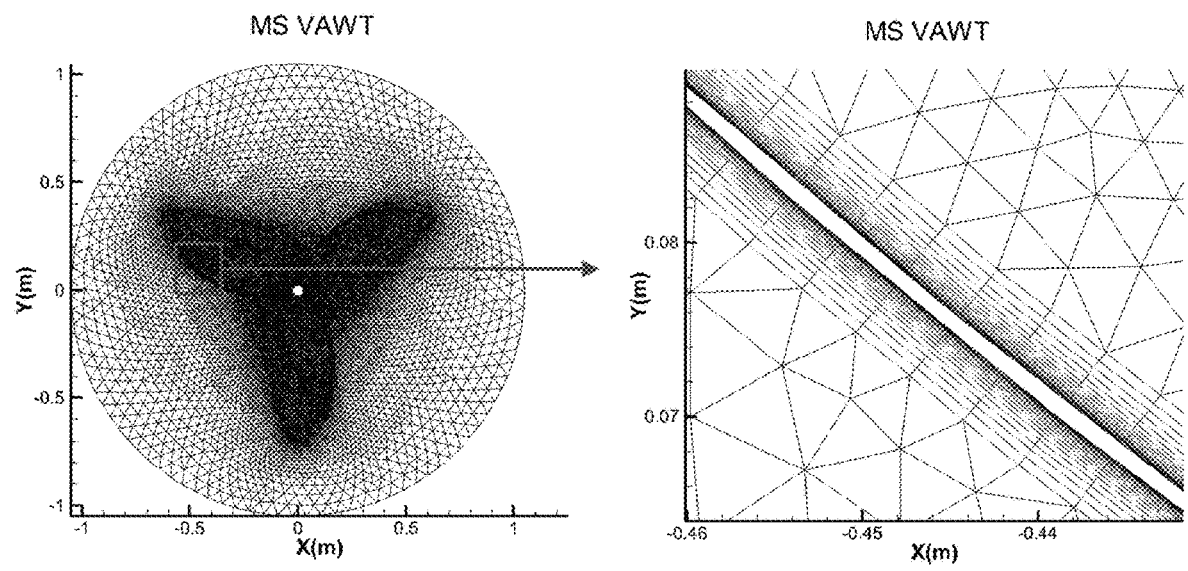
FIG. 3(a) illustrates the mesh of the MS VAWT. An overview of the meshes near the VAWT was shown on the left column, and a close-up view of the meshes near the Savonius rotor was shown on the right column.
Figure 3B:
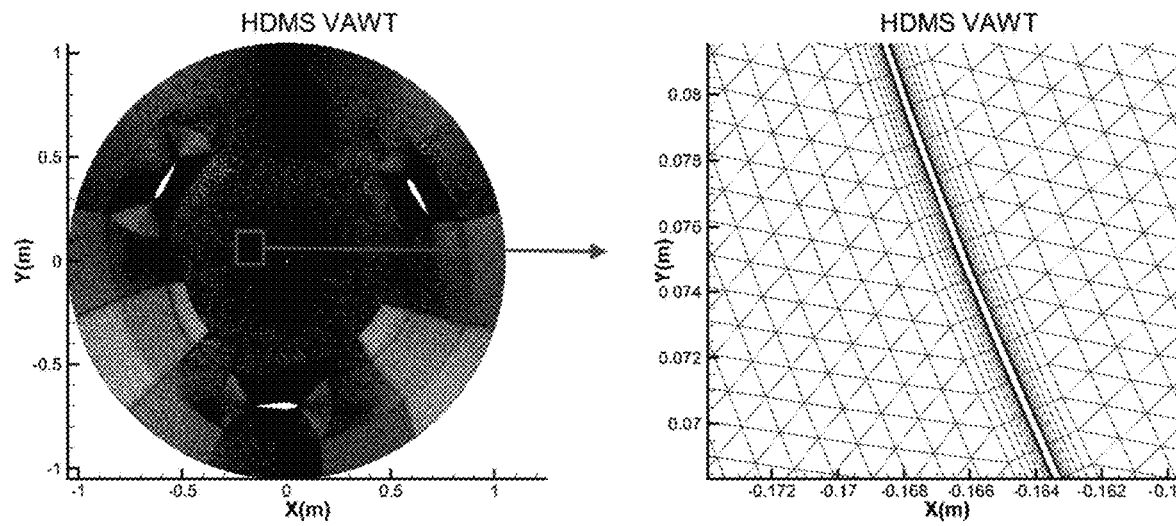
FIG. 3(b) illustrates the mesh of the HMIS VAWT. An overview of the meshes near the VAWT was shown on the left column, and a close-up view of the meshes near the Savonius rotor was shown on the right column.

Unstructured meshes were generated using the commercial meshing software ANSYS ICEM. Since the second-order accurate numerical methods were used in all simulations, fine meshes were required in the vicinity of the wind turbine rotor to capture the intricate vortex dynamics. To ensure mesh quality near wall boundaries, inflation layers were incorporated around rotor surfaces to better resolve the boundary layer flow. Meshes near the turbine rotor of the MS and HMIS VAWTs are shown in FIG. 3.

Figure 4C:
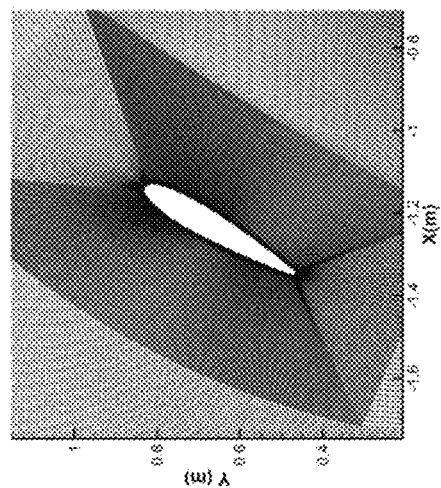
FIG. 4(c) was an example of the fine mesh used in the mesh refinement study.
Figure 4B:
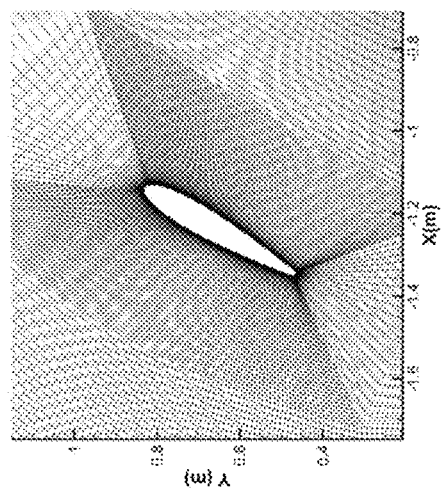
FIG. 4(b) was an example of the medium mesh used in the mesh refinement study.
Figure 4A:
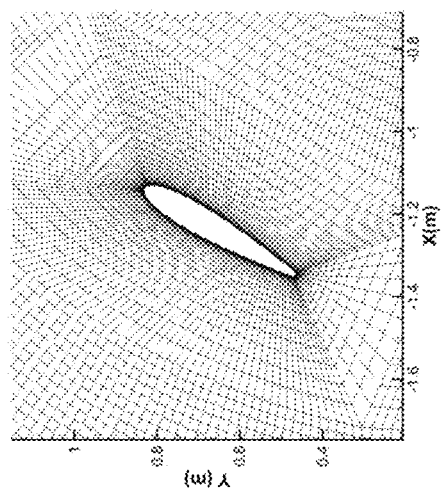
FIG. 4(a) was an example of the coarse mesh used in the mesh refinement study.
Figure 5:
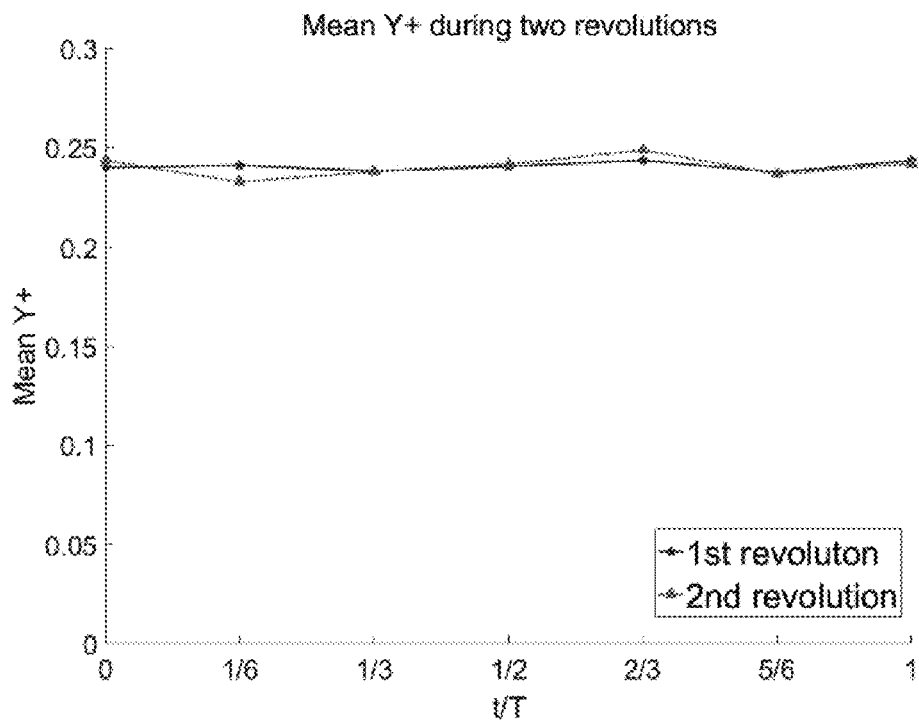
FIG. 5 illustrates the mean $y^+$ of the medium mesh during two successive revolutions.

To estimate the quality of the mesh used in this study, a benchmark test of a Darrieus VAWT presented by Li et al. [22] was simulated as well. In this simulation, the turbine configuration, blade geometry, and Reynolds number were exactly the same as those in Li's case. Three sets of meshes were used in this simulation, namely, a coarse mesh with 60,579 elements, a medium mesh with 209,324 elements, and a fine mesh with 550,484 elements (see FIGS. 4(a)-(c)). The refinement was carried out in both the radial and circumferential directions simultaneously. In FIG. 5, the mean $y^+$ of the wind turbine rotor of the medium mesh during two successive revolutions are shown. Note that $y^+$ was anon-dimensional wall distance defined as $y^+ = u_\tau h/v$, where $u_\tau$ was the friction velocity, h was the size of the first mesh layer, and v was the kinematic viscosity of the fluid. it was observed from FIG. 5 that the mean $y^+$ was smaller than one and has only tiny fluctuation in one revolution. Additionally, the variation of $y^+$ from two successive revolutions was also small.

Figure 6:
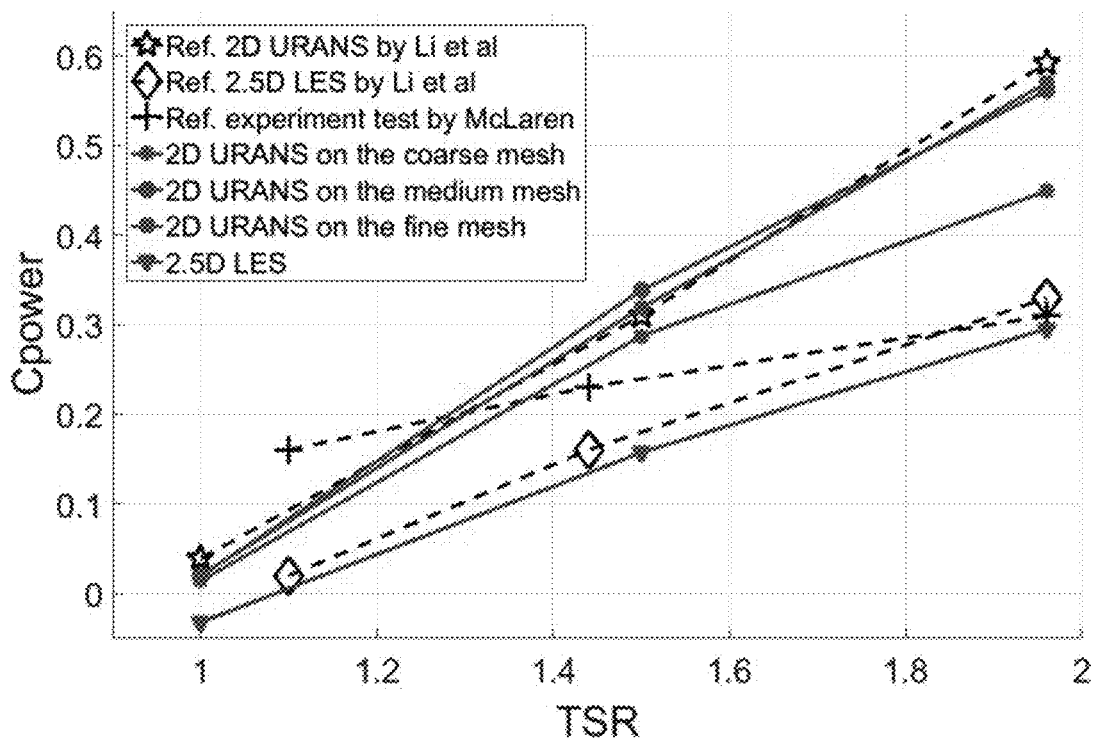
FIG. 6 illustrates the power coefficients at different TSRs in the benchmark test with three sets of meshes and the comparison with previous experiments and numerical simulations.
Figure 7B:
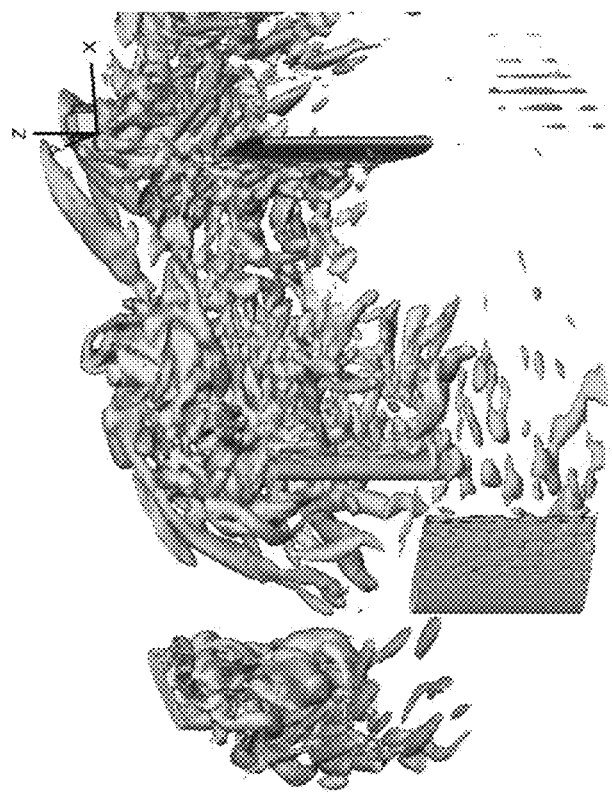
FIG. 7(b) illustrates the vortical structures represented by the iso-surface of the Q criterion with a value of 1000 from LES simulations at the TSR of 1.96, The wind was blowing in the x direction.
Figure 7A:
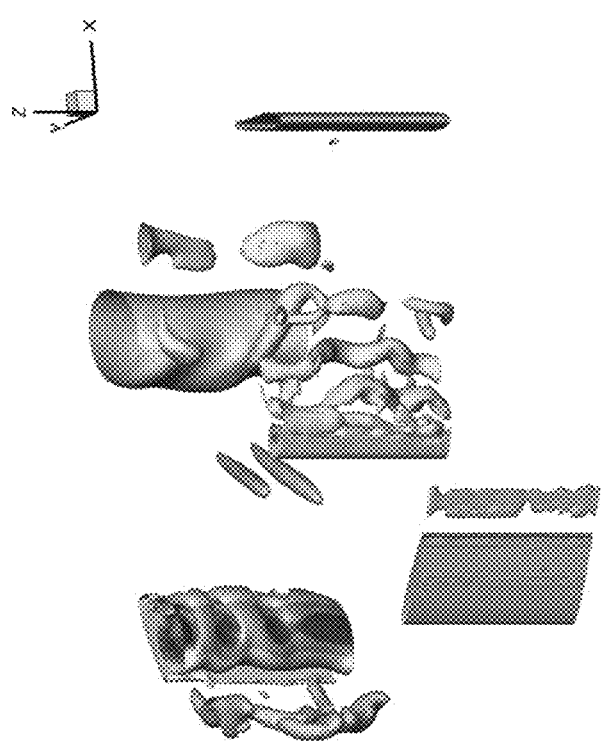
FIG. 7(a) illustrates the vortical structures represented by the iso-surface of the Q criterion with a value of 1000 from 2.5D URANS simulations at the TSR of 1.96. The wind was blowing in the x direction.

Both URANS and large eddy simulation (LES) were performed to verify the current numerical setup. Note that LES was conducted on a 3D mesh generated by extruding the 2D coarse mesh in the spanwise direction; and periodic boundary conditions were enforced on the spanwise surfaces. This type of simulation was termed as 2.5D LES. The same conventions apply to 2.5D URANS. Simulation results from 2D mesh refinement studies with URANS and 2.5D LES are presented in FIG. 6. Therein, the comparison with previous studies was also shown. It was observed that 2D URANS results from the three sets of meshes show reasonable convergence towards those presented by Li et al. [22]. 2.5D LES results also agree with those from Li et al. [22]. Similar to the observation from Li et al. [22], it was found that results from 2.5D LES agree reasonably well with those from wind tunnel experiments by McLaren [55] at relatively large TSRs. FIG. 7 shows the vortical structures represented by the .iso-surface of the Q criterion with a value of 1000 from 2.5D UTRANS and LES simulations at the TSR. of 1.96. The iso-surface of Q was colored by the streamwise velocity. Again, similar to the results presented by Li et al. [22], LES can capture more small vortical structured than URANS, especially in the vicinity of the turbine rotor downwind.

Figure 8:
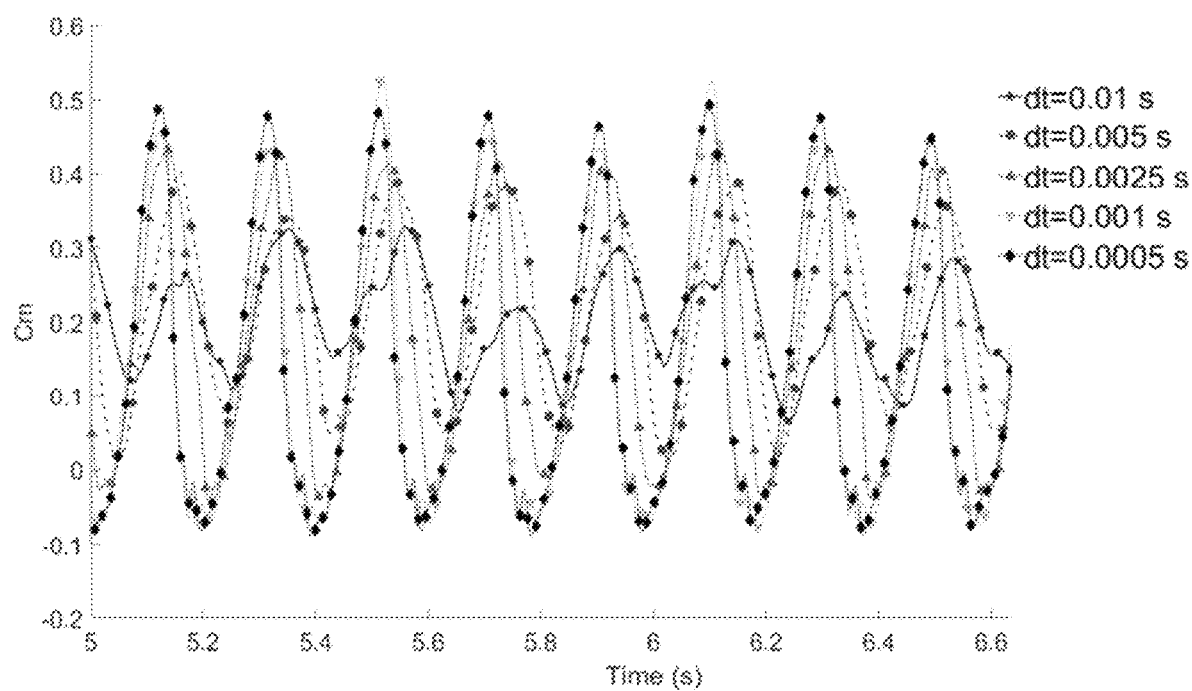
FIG. 8 shows the histories of the moment coefficient of the benchmark Darrieus VAWT when $U_\infty=10$ m/s and TSR=1.5 with different time steps.
Figure 9A:
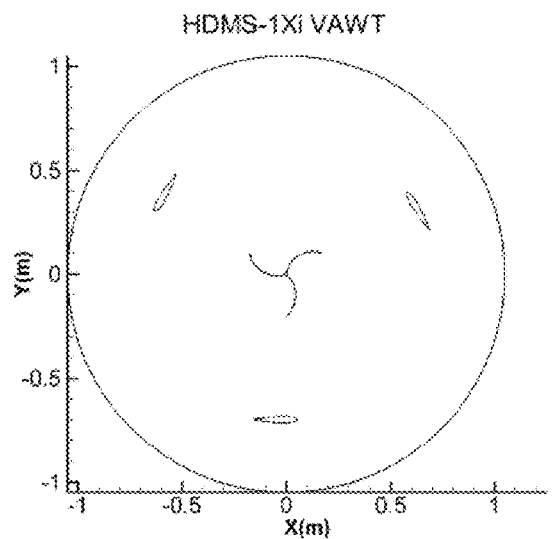
FIG. 9(a) illustrates the configuration of an HDMS-1Xi VAWT.
Figure 9B:
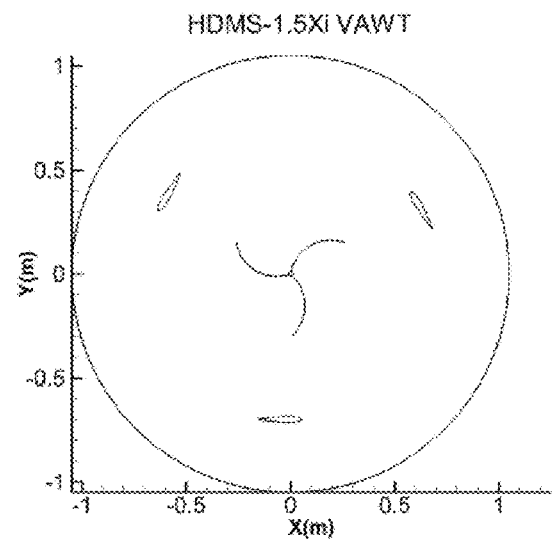
FIG. 9(b) illustrates the configuration of an FIDMS-1.5Xi. YAWT.
Figure 9C:
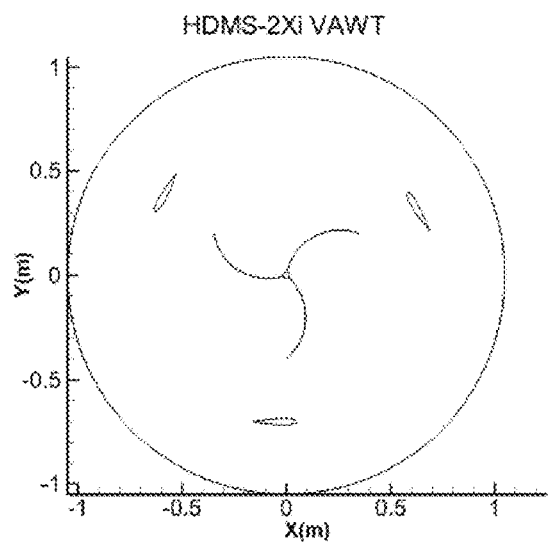
FIG. 9(c) illustrates the configuration of an 1IDMS-2Xi VAWT.
Figure 9D:
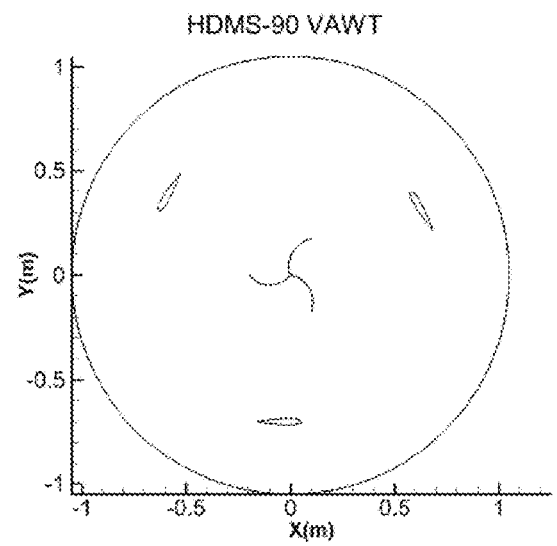
FIG. 9(d) illustrates the configuration of an HDMS-90 VAWT.

For transient simulation of the highly unsteady flow passing over VAWTs, flow physics can be sensitive to the time step. Sorensen et al. [57] and Travin et al. [58] suggested that the non-dimensional time steps $\tau = \Delta t \cdot U_\infty/L$ can be about 0.01 and 0.025 to handle the unsteady flow features. To study the time-step sensitivity, a set of time steps were tested on the medium mesh with the benchmark Darrieus VAWT problem. In this case, the wind velocity $U_\infty$ was set to 10 m/s, and a prescribed motion with TSR=1.5 was used. The histories of the moment coefficients for different time steps are presented in FIG. 8 and Table 2. From FIG. 8, it was observed that there exists marginal difference between the $C_m$ history with dt=0.001 s (r=0.025) and that with dt=0.0005 s (τ=0.0125). It was also found from Table 2 that the differences of the mean moment coefficients $\overline{C}_m$ between the two cases with different di are less than 1%. To save computational cost, the time step dt=0.001 s was selected for all the simulations in the remainder of the Examples presented herein.

TABLE 2

Time step and mean moment coefficient

| Time step (s) | 0.01 | 0.005 | 0.0025 | 0.001 | 0.0005 |
|---|---|---|---|---|---|
| $\overline{C}_m$ | 0.1993 | 0.2139 | 0.1884 | 0.1475 | 0.1472 |

Example 2

Self-Starting Capability of Different VAWTs

In Example 2, the self-starting capability of both the MS and HDMS VAWTs at the same Reynolds number was numerically studied under wind-driven conditions. Different damping factors were used to reach different final TSRs. Numerical results from each type of VAWTs are presented and discussed.

As discussed by Dominy et al. [25], researchers have different definitions of the self-starting capability of a VAWT. Although no consensus of the term self-starting has been achieved, approaches based on aerodynamic characteristics of the VAWTs in isolation from their resistive load may serve as unbiased ways to define self-startup. In this study, the "self-starting" capability of a VAWT is defined as that the wind turbine can reach the desirable TSRs under nominal wind conditions without external load. As a result, the turbines can effectively harvest wind energy when appropriate energy collectors (in the form of external load) are activated.

It is noted that due to the drag-driven nature, the Savonius and MS VAWTs do not have the self-starting issue: they can always accelerate to the desirable TSRs under nominal wind conditions without external load. Therefore, the self-starting capability will be primarily studied for the Darrieus and HDMS VAWTs as in this example. It was observed from Equation (4) that large inertia of VAWTs would lead to small acceleration. As has been recognized, Darrieus VAWTs at low angular velocity could encounter large dynamic stall [24], which can significantly decrease the aerodynamic moment acting on the turbines. Hence, it was desirable to search for a reasonable range of the VAWT inertia, which can lead to the desirable TSRs.

To study the effects of the moment of inertia on the startup process of VAWTs, numerical simulations were performed for both the Darrieus and HDMS VAWTs under free load. The simulations were performed using 2D URANS with the S-A turbulence model as discussed in Example 1. Different designs of HMIS VAWTs were also tested in this example. In these designs, only the size of the inner MS rotor, or its alignment with respect to the Darrieus rotor was altered. Four different configurations, namely, HDMS-1Xi, HDMS-1.5; Xi, HDMS-2Xi, and HMIS-90 VAWTs, as shown in FIGS. 9(a)-(d), were studied here. Note that HDMS-1Xi was the original design, as described in Example 1. In HDMS-1.5Xi and HDMS-2Xi, the alignment of the inner MS rotor, relative to the Darrieus blades, was the same as that of the original design, while the radii of the inner MS rotors were 1.5 and 2 times of the original one, respectively. In HDMS-90, the radius of the inner MS rotor was the same as that of the original design, while the relative position between the inner MS rotor and the outer Darrieus rotor was adjusted by 90° along the anti-clockwise direction.

2.1 Effects of the Moment of Inertia of VAWTs

The acceleration histories for both the ITIDMS-1Xi and the Darrieus VAWTs with different moment of inertia are presented in FIG. 10. From FIG. 10(a), it was observed that for the HDMS-1Xi VAWT, if there was no initial angular velocity, only when the moment of inertia was small (i.e., I=0.1 kg·m² in this study), the angular velocity can reach a high value of approximately 27 rad/s. From FIG. 10(b), it was found that when the moment of inertia I was set as 0.1 kg·m², the Darrieus VAWT can rotate, but the angular velocity was very low and not stable. As a result, it cannot effectively harvest wind energy when an energy collector was activated. According to our definition of self-startup, the Darrieus VAWT has poor self-starting capability. By contrast, the HDMS-1Xi design has better self-starting capability due to the assistance from the inner MS rotor.

Figure 11A:
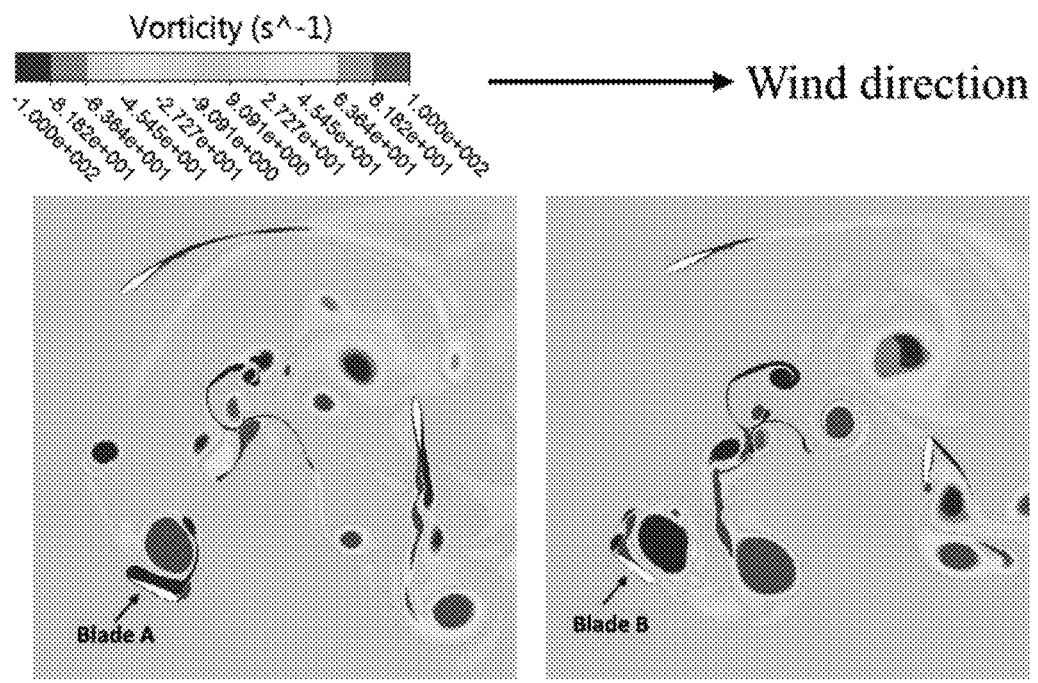
FIG. 11(a) shows the vorticity fields of HDMS-1Xi VAWTs with I=0.1 kg·m² (left) and I=0.2 kg·m² (right) in one revolution. Note that the durations of one revolution for the two VAWTs are different from each other due to different dynamic characteristics. The vorticity fields for both turbines are extracted from the time slot [4 s, 5.5 s], during which the VAWT with I=0.1 kg·m² experiences large acceleration, as shown in FIG. 10(a).
Figure 11B:
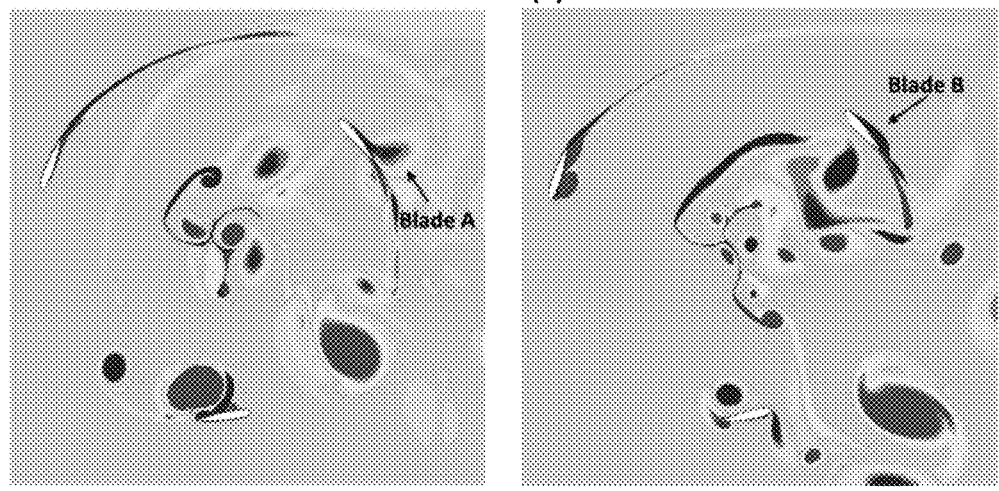
FIG. 11(b) shows the vorticity fields after ½ revolution relative to FIG. 11(a).
Figure 11C:
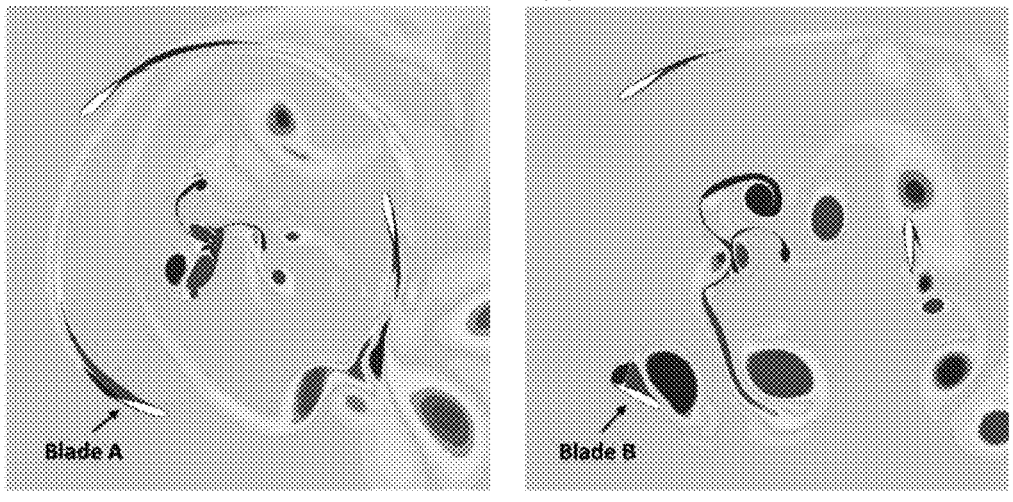
FIG. 11(c) shows the vorticity fields after a full revolution relative to FIG. 11(a).

From FIG. 10(a), it was also observed that the HDMS VAWT with I=0.1 kg·m² accelerated from about 8 rad/s to 20 rad/s during 4.4 s-4.8 s. However, the speed of the VAWT with I=0.2 kg·m2 remains low at 5 rad/s approximately during the same period. To explain this difference, vorticity fields in the z direction (i.e., the direction of the rotor shaft) of the two HDMS VAWTs in one revolution during 4.4 s-4.8 s are displayed in FIGS. 11(a)-(c). Therein, the vorticity field around the Blade A in the VAWT with I=0.1 kg·m² (left) and that around the Blade B in the VAWT with I=0.2 kg·m² (right) was compared. As shown in FIG. 11(a), large flow separation shows up on the suction surface of both Blade A and Blade B. As a result, both VAWTs experience severe dynamic stall. After one revolution, as presented in FIG. 11(c), the Blade A has accelerated to a higher angular velocity (approximately 20 rad/s) due to its lower inertia, and the flow separation becomes much smaller than that at the initial position as displayed in FIG. 11(a). As a result, the Blade A can accelerate continuously, eliminating dynamic stall gradually. By contrast, due to the large inertia. of the VAWT with I=0.2 kg·m², the Blade B cannot accelerate to a higher angular velocity. At the position as shown in FIG. 11(c), the flow separation on the suction surface was still severe, making the next revolution with low angular velocity recurrently.

According to the discussion above, low angular velocity was the cause of severe dynamic stall; and high angular velocity can reduce dynamic stall, assisting self-startup. To verify it, the acceleration process of the HDMS VAWT with I=0.2 kg·m² with an initial angular velocity of 8 rad/s was also presented in FIG. 10. As observed, this VAWT can accelerate to a final angular velocity which was similar to the VAWT with I=0.1 kg·m². This was because that at the startup stage, the dynamic stall was eliminated by the initial angular velocity.

To summarize, the HDMS design shows better self-starting capability than the Darrieus design due to the acceleration torque generated by the inner MS rotor. The self-starting capability of the original HDMS design (i.e., HDMS-1Xi) depends on the moment of inertia and initial angular velocity. Either small inertia or sufficiently large initial velocity can enhance the self-starting capability of HDMS VAWTs.

2.2 Effects of Different HDMS Designs

Figure 12A:
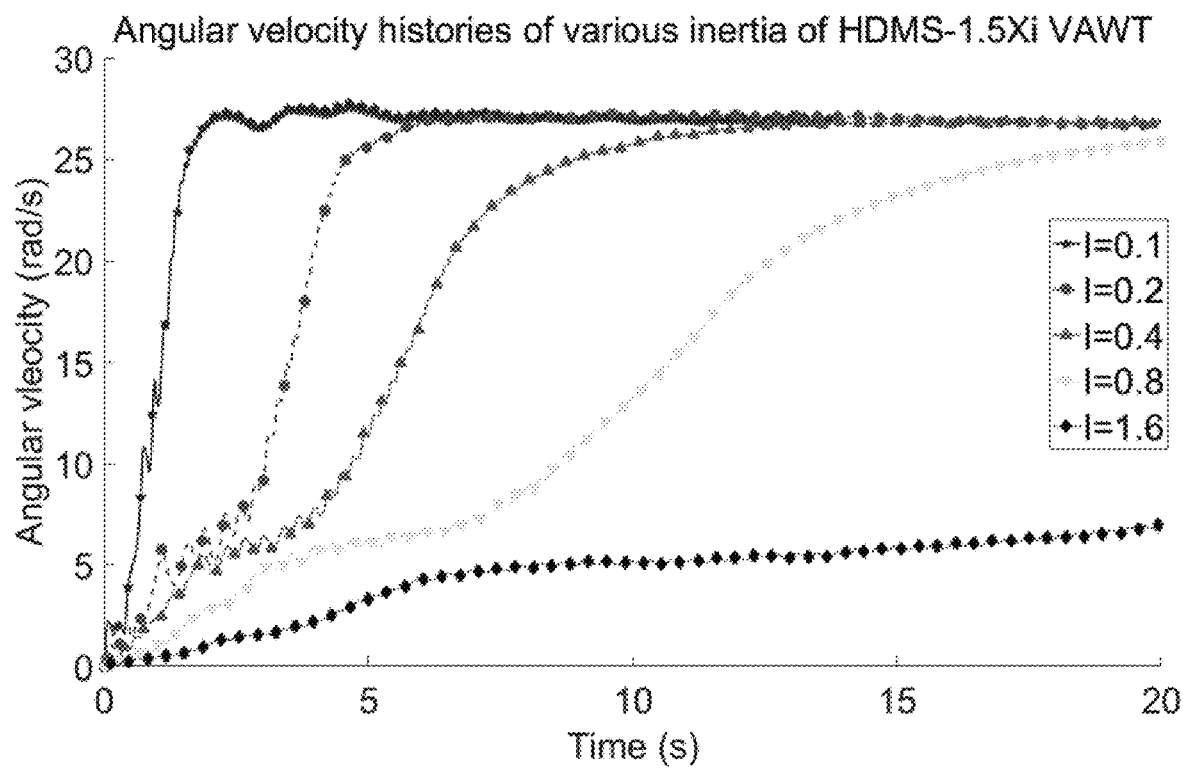
FIG. 12(a) shows the history of the angular velocity for the HDMS-1.5Xi VAWT under free load.
Figure 12B:
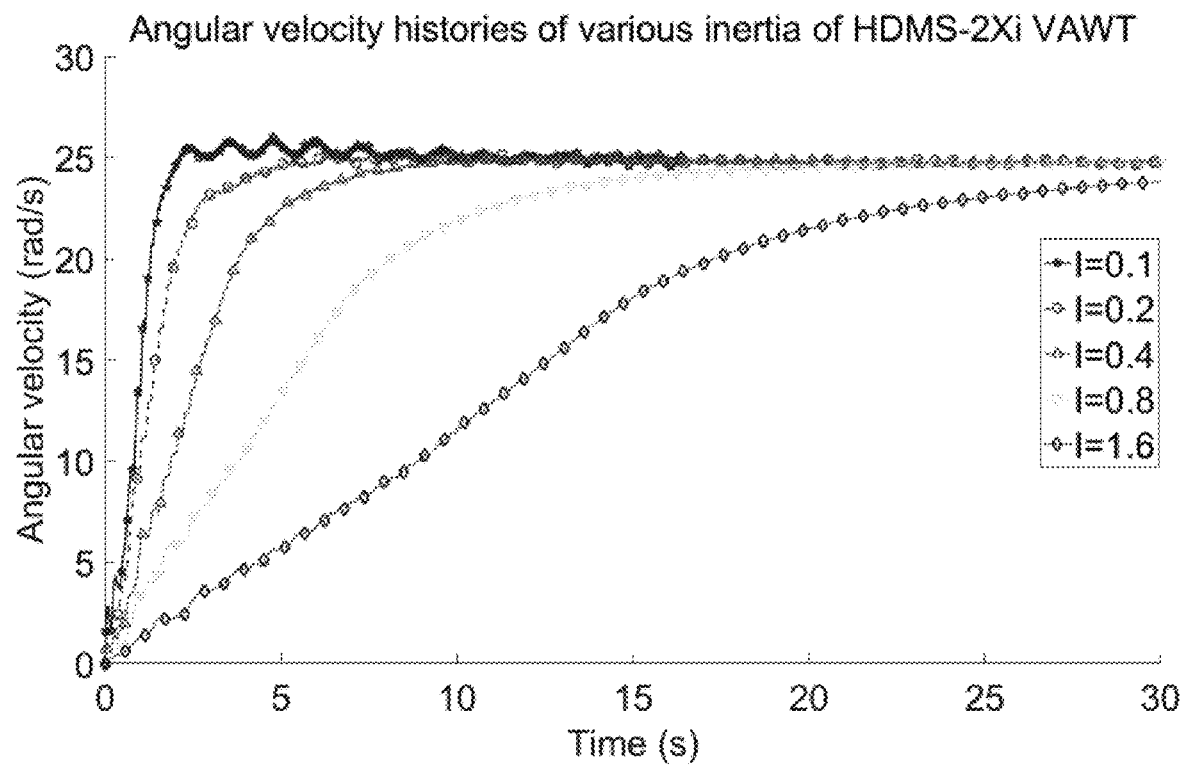
FIG. 12(b) shows the history of the angular velocity for the FIDMS-2Xi VAWT under free load.

In this section, the configuration of HDMS VAWTs was varied, and its effects on the self-starting capability were studied. The acceleration histories of the HDMS-1.5Xi VAWT and the HDMS-2Xi VAWT with different moment of inertia are presented in FIGS. 12(a) and (b). As observed, the self-starting capability was significant improved when the size of the inner MS rotor increases. Specifically, for the HDMS-1.5Xi VAWT, it can start automatically with I=0.8 kg·m²; for the HDMS-2Xi VAWT, the self-starting capability was even better: it can start automatically with I=1.6 kg·m². However, for both VAWTs, the startup process takes a longer time when the moment of inertia was larger. It was also worthy of pointing out that for the HDMS-1.5Xi VAWT with I=0.8 kg·m², it takes about 20 s for the self-starting process; but for the HDMS-2Xi VAWT with the same moment of inertia, it only needed approximately 15 s to start. Meanwhile, by comparing the angular velocity histories of HDMS-1Xi, 1.5Xi and 2Xi in FIGS. 10 and 12, it was observed that after self-startup, the mean angular velocities of the HDMS-1Xi, 1.5Xi, and 2Xi were about 28 rad/s, 26 rad/s, and 24 rad/s, respectively. Therefore, the larger inner MS rotor can improve the self-starting capability and reduce the startup time simultaneously. However, larger MS rotors can also result in a slight reduction of the final angular velocity that the VAWT without external load can reach. Its impact on the energy harvesting efficiency will be discussed in Example 3.

For the HDMS-90 VAWT, the self-starting behavior was very similar to the original design, i.e., the HDMS-1Xi VAWT (results are not shown here). Based on the numerical simulation results, the alignment of the inner MS rotor with respect to the Darrieus rotor has negligible effect on the self-starting capability. Therefore, no further study was conducted for the HDMS-90 VAWT.

Example 3

Wind Energy Harvesting Efficiency of the VAWTs

In Example 3, the power efficiencies were studied for both the MS and HDMS VAWTs. A comparison of aerodynamics with the wind-driven approach and that with the prescribed motion approach for the HDMS VAWT was also presented.

As demonstrated in Example 2, the MS and HDMS VAWTs have good self-starting capability under free load. In this section, the wind energy harvesting performance of these two types of wind turbines was studied under an external load $M_{load}$-$C\dot{\theta}$, as introduced in Equation (5). Note that when the damping factor C becomes larger, a stronger aerodynamic moment was needed to accelerate the turbine to a stable operating status. If the VAWT cannot reach a statistically steady rotating speed to effectively collect wind energy, the external load was too large for the VAWT to sustain operation automatically. The different responses of the MS and HDMS VAWTs to the external load (i.e., the damping factor C in this study) are presented below.

3.1 Energy Harvesting Performance of the Wind-Driven MS VAWTs

Figure 13A:
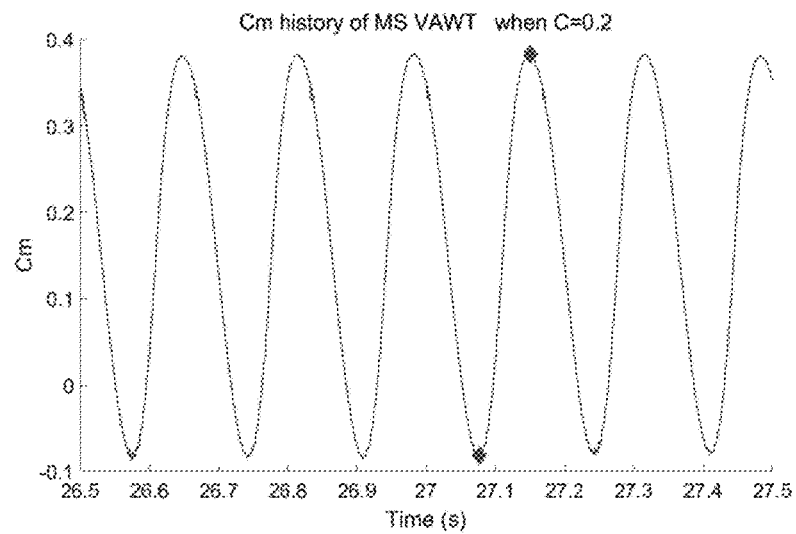
FIG. 13(a) shows the moment coefficient $C_m$ history for the MS VAWT.
Figure 13B:
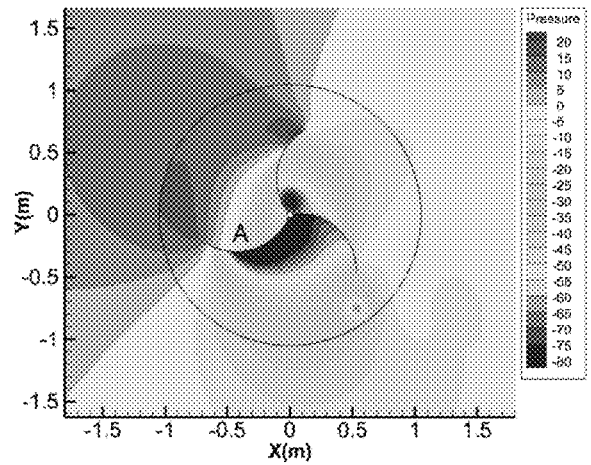
FIG. 13(b) shows the pressure field corresponding to the maximum $C_m$ value for the MS VAWT.
Figure 13C:
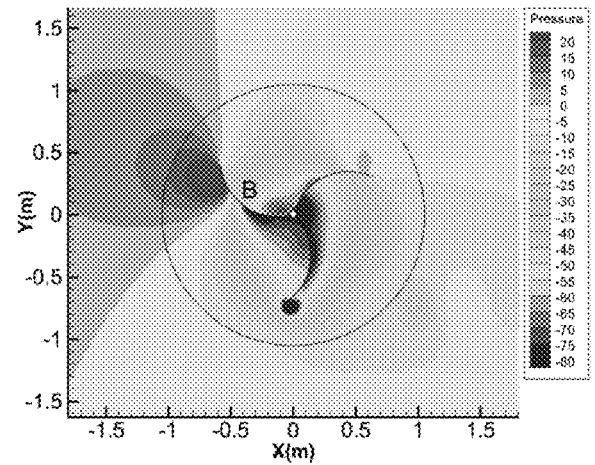
FIG. 13(c) shows the pressure field corresponding to the minimum $C_m$ value for the MS VAWT.

As shown in FIG. 13(a), when the rotation of the MS VAWT becomes stable, the aerodynamic moment shows a periodic feature. The pressure fields at two phases where the maximum and minimum aerodynamic moments occur are presented in FIGS. 13(b) and (c), respectively. It was observed from FIG. 13(b) that when the aerodynamic moment reaches its maximum value, a large pressure difference between the two surfaces of blade A drives it to move in the anti-clockwise direction. By contrast, it was observed from FIG. 13(c) that when the aerodynamic moment reaches its minimum value, there exists a large pressure difference on the tip region of the blade B, which hinders the rotation of the MS turbine in the anti-clockwise direction. This adversely decreases the total aerodynamic moment which sustains the anti-clockwise rotation, thus degrading the energy harvesting efficiency.

Figure 14A:
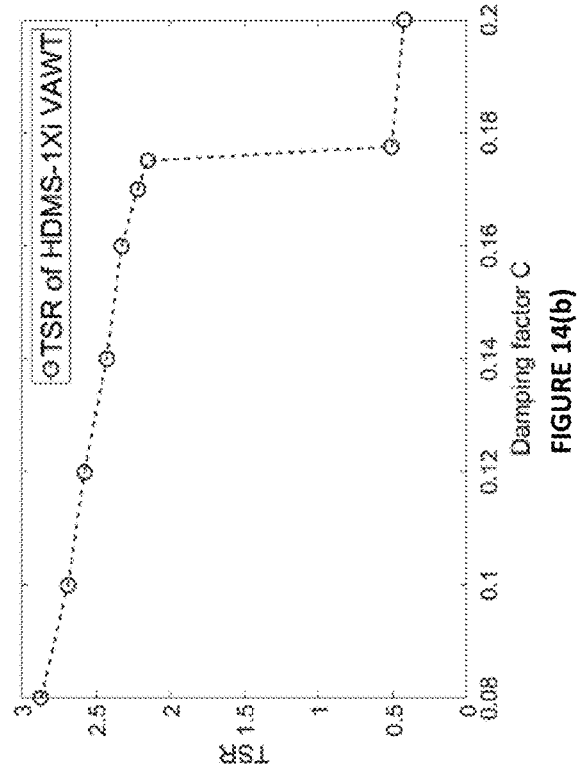
FIG. 14(a) shows the TSR as a function of damping factor for the MS VAWT.

For the MS VAWT, when the clamping factor C increases, a smaller final angular velocity (thus a smaller TSR) will be achieved, as displayed in FIG. 14(a). it was also found that the TSR varies smoothly with the damping factor C. In FIG. 15(a), both power coefficient and aerodynamic moment of the MS VAWT are displayed as functions of TSRs. It was observed that the aerodynamic moment increases when the TSR decreases. However, there exists an optimal enemy harvesting, efficiency when the TSR was approaching 1.2. From FIG. 15(a), it was also observed that the maximum power efficiency of the MS VAWT was about 28%, which was about half of the theoretical maximum value (59.3%) based on Betz's law [56]. We note that the variation patterns of both the power and moment coefficients have reasonable agreement with the experimental results obtained by Wekesa et al. [11] using a three-bladed Savonius VAWT.

Figure 14B:
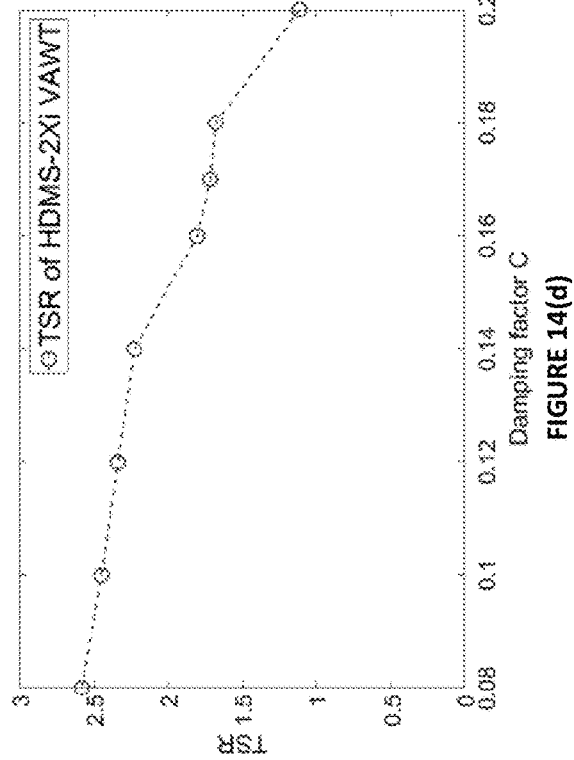
FIG. 14(b) shows the TSR. as a function of damping factor for the HDMS-1S-1Xi VAWT.
Figure 14C:
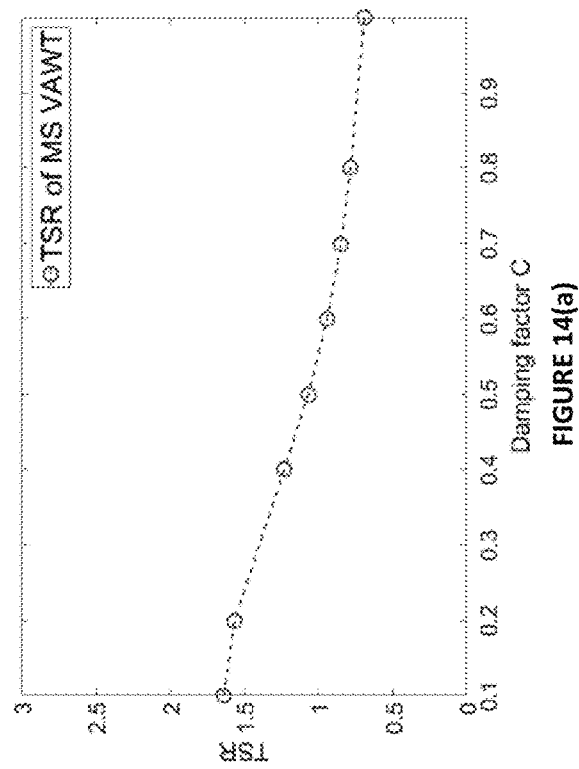
FIG. 14(c) shows the TSR as a function of damping factor for the HDMS-1.5Xi VAWT.
Figure 14D:
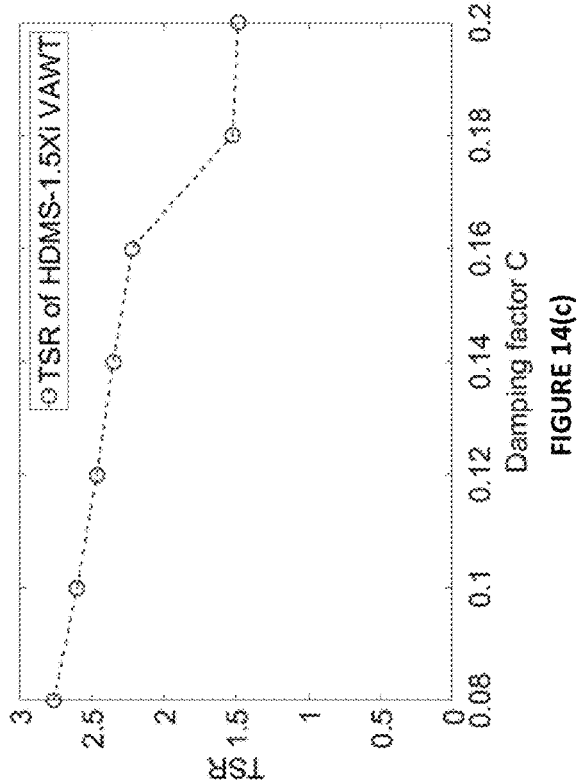
FIG. 14(d) shows the TSR as a function of damping factor for the HDMS-2Xi VAWT.
Figure 16A:
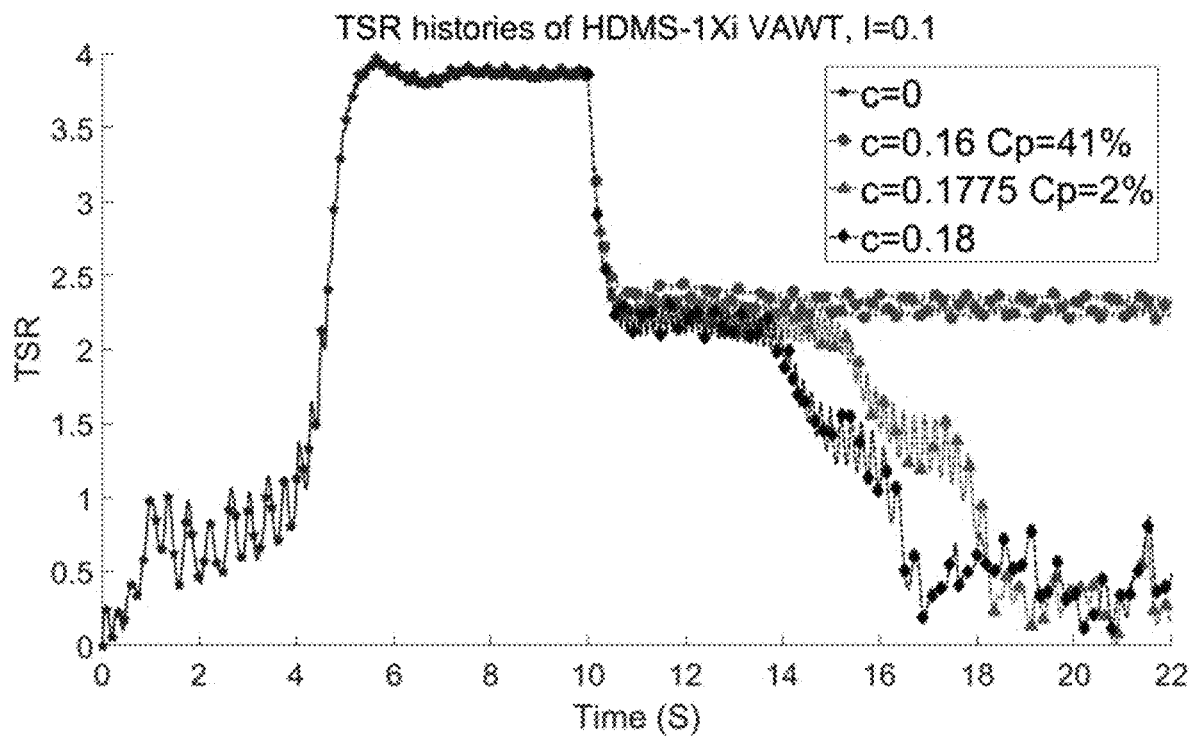
FIG. 16(a) illustrates the TSR history for typical cases of the HDMS-1Xi VAWT.
Figure 16B:
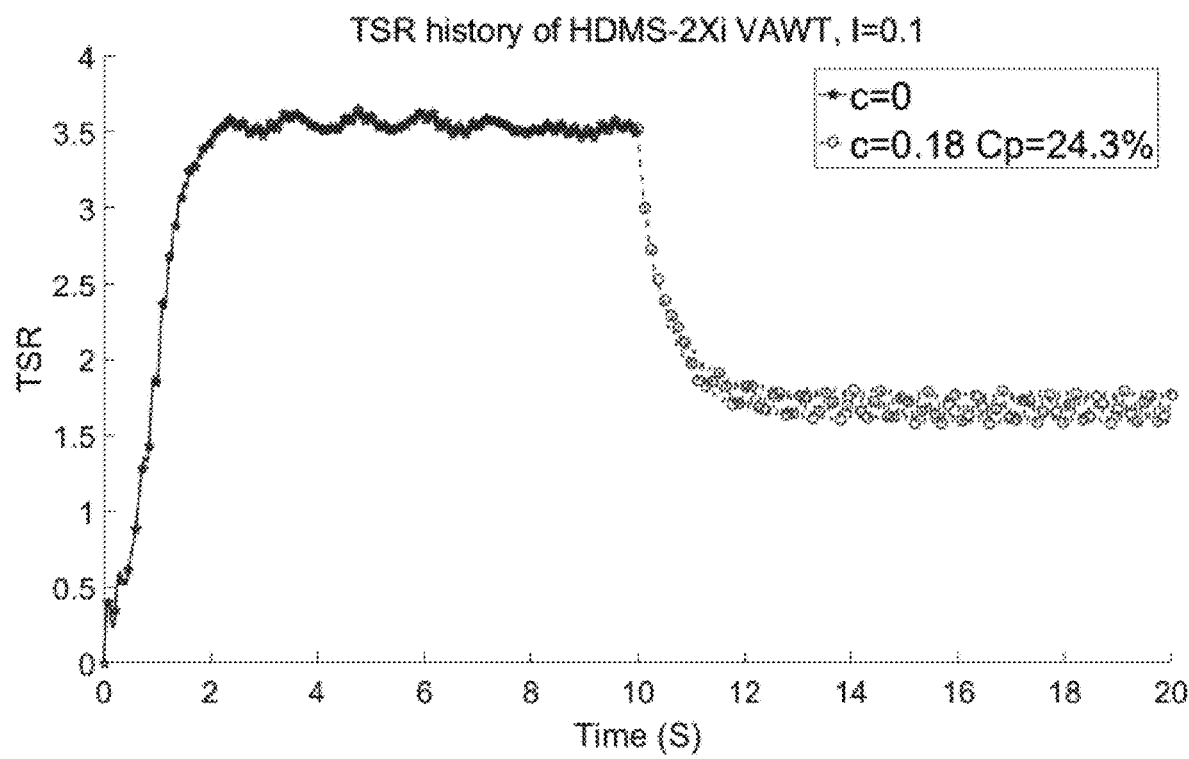
FIG. 16(b) illustrates the TSR history for typical cases of the HDMS-2Xi VAWT.

3.2 Energy Harvesting Performance of the Wind-Driven HDMS VAWTs a. Comparison of Energy Harvesting Performance Under Different External Load As mentioned previously, a linear damping effect was added to the VAWTs when the system reached a stable operating status under free loading conditions. For consistency, the moment of inertia of the HDMS VAWTs studied in this section was fixed at I=0.1 kg·m². All HDMS designs (i.e., HDMS-1Xi, 1.5Xi and 2Xi) with this moment of inertia can start automatically without external load. The variation of TSR as a function of the damping factor C for HDMS-1Xi, 1.5Xi, and 2Xi VAWTs are presented in FIGS. 14(b), (c) and (d), respectively. Similar to the MS VAWT, the angular velocities of all the HDMS VAWTs decrease when the damping factor C becomes larger. However, for the HDMS-1Xi VAWT, the TSR has a sharp decrease under certain external load (in this case, C=0.1775 kg·m²/s) due to dynamic stall (this will be further discussed in b. below). As a result, the TSR would become aperiodic, and even chaotic as shown in FIG. 16(a). It was clearly seen from this figure that when C=0.16 kg·m²/s, the power coefficient was more than 40%; when C=0.1775 kg·m²/s and C=0.18 kg·m²/s, the power coefficient was almost zero. But for the HDMS-1.5 Xi and HDMS-2Xi VAWTs as displayed in FIGS. 14(b) and (c), although the angular velocity also decreases when the damping factor C increases, no apparent sudden TSR drop shows up. Their final angular velocity was more stable than that of the HDMS-1Xi VAWT as observed from FIG. 16(b). Therein, it was also found that for the HDMS-2Xi VAWT, even when the damping factor was C=0.18 kg·m²/s, the angular velocity remains about 14 rad/s, and the power coefficient was about 24%.

The variation of power coefficients and aerodynamic moments with respect to TSRs for all HDMS VAWTs was displayed in FIGS. 15(b), (c) and (d). Similar to the MS VAWT, there exists an optimal TSR for maximum energy extraction. However, unlike the MS VAWT, there was good correspondence between the power coefficient and aerodynamic moment for the HDMS VAWTs: the power coefficient reaches its maximum when the aerodynamic moment was at its maximum. For the HDMS-1Xi VAWT, when TSR decreases to approximately 0.5, i.e., at the damping factor C=0.1775 kg·m²/s, the total aerodynamic moment will also decrease sharply as well as the power coefficient. For the HDMS-1.5Xi and HDMS-2Xi VAWTs, similar trends follow. But due to their better performance at larger damping factors, the power coefficient and wind moment were higher than those of the HDMS-1Xi VAWT when the damping factor becomes relatively large.

It was observed from FIG. 15(b) that when the TSR approaches 2.3, the HDMS-1Xi VAWT can reach its maximum power coefficient of approximately 41%, which was about two thirds of the theoretical maximum value (59.3%). From FIGS. 15(c) and (d), the maximum power coefficients of the HDMS-1.5Xi and HDMS-2Xi VAWTs were 37.5% and 33% respectively, when the TSR approaches 2.2. Hence, compared with the MS VAWT, the maximum power coefficients of all types of HDMS VAWTs were higher. The HDMS VAWTs have better performance when TSR was relatively large (i.e., approximately two in this study). Furthermore, it was found that the MS rotor in the center of the HDMS VAWTs contributes adversely to the energy harvesting efficiency, since the maximum power coefficient decreases when its size increases. However, a larger inner MS rotor can facilitate self-startup, and maintain acceptable performance when the damping factor C becomes large. More discussions about the impact of inner MS rotors on the aerodynamic performance will be presented below in 3.3.

b. More Discussions on Aerodynamics of the HDMS VAWTs

Figures 17A, 17B:
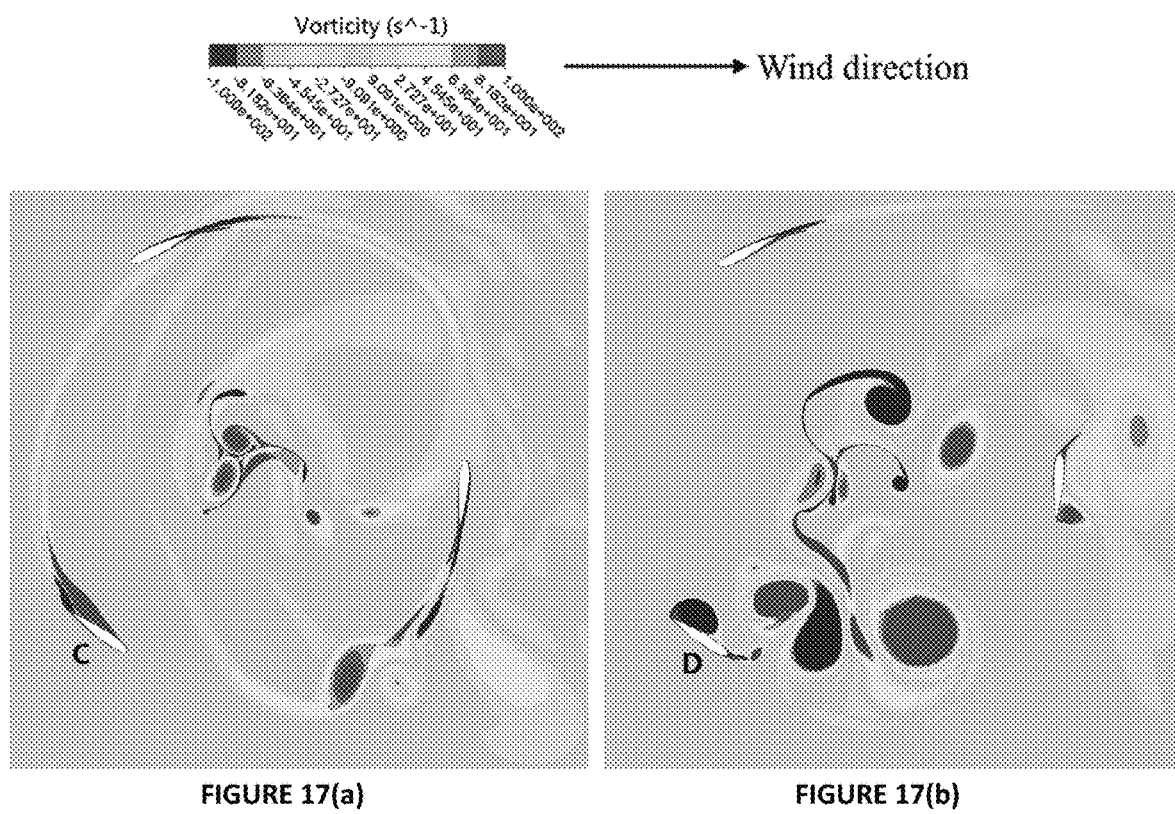
FIG. 17(a) shows the vorticity fields in the z direction when $C_{power}$=41% (TSR=2.3) for the HRMS-1Xi VAWT.
FIG. 17(b) shows the vorticity fields in the z direction when $C_{power}$=2% (TSR=0.5) for the HDMS-1Xi. VAWT.
Figures 18A, 18B:
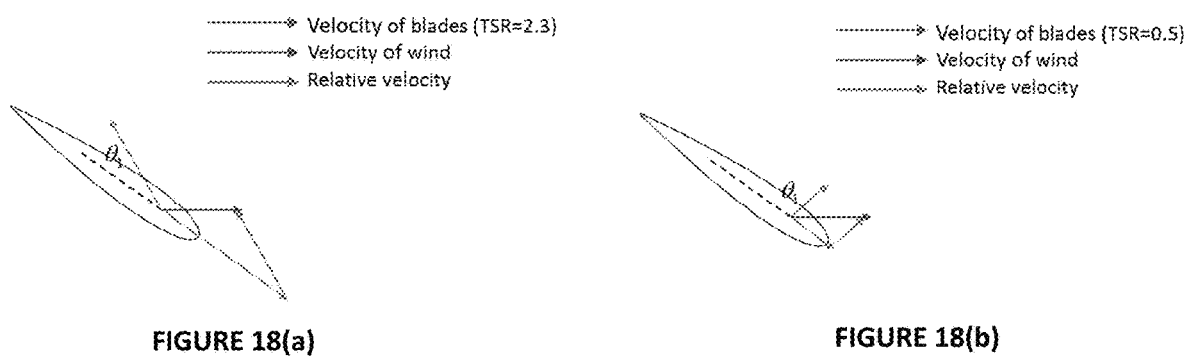
FIG. 18(a) illustrates the relationship among relative velocity, wind velocity and blade velocity of a Darrieus blade at TSR=2.3.
FIG. 18(b) illustrates the relationship among relative velocity, wind velocity and blade velocity of a Darrieus blade at TSR=0.5.

The energy harvesting features of the HDMS-1Xi VAWT are further discussed in this section. As was known, dynamic stall can occur on the Darrieus rotor at large angles of attacks (AoAs). As shown in FIG. 16(a), when the damping factor C was 0.16 kg·m²/s, the TSR was 2.3, and the power coefficient reaches its maximum value 41%; when the damping factor C reaches 0.1775 kg·m²/s, the mean TSR was 0.5, and the corresponding power coefficient was only about 2%. FIGS. 17(a) and (b) show the vorticity fields in the z direction of the two cases. It was observed that compared with the flow field around the blade C in FIG. 17(a), larger flow separation (or dynamic stall) occurs on top of the blade D in FIG. 17(b). As a result, the aerodynamic moment acting on the blade C was about 1.497 N·m (accelerating the anti-clockwise rotation), while the aerodynamic moment acting on the blade D has a negative value about −1.237 N·m (decelerating the anti-clockwise rotation). Thus, dynamic stall has significant effect on the performance of the Darrieus rotor. A theoretical analysis of the local AoA for the blade in the position of C and D was then conducted to explain the formation of the dynamic stall. In FIG. 18, it was clearly seen that when TSR decreases, the local AoA experienced by the Darrieus rotor will increase, resulting in dynamic stall on the suction surface of the airfoil. As a result, when the TSR was small, regions with large flow separation will show up. This leads to a small anti-clockwise or even a large clockwise aerodynamic moment, which can significantly reduce the energy output.

3.3 Performance Analysis of the HDMS VAWTs with Prescribed Motion a. Analysis Using 2D URANS As was known, the motor-driven turbine (i.e., turbine with prescribed motion) can reproduce the physics of a wind-driven turbine under certain conditions [48]. Hence, much research on the aerodynamic performance of VAWTs has been conducted for wind turbines with prescribed motion. The advantage to use the prescribed motion approach was that the turbine operation conditions can be precisely set up, and less simulation effort was needed to obtain the flow physics.

Figure 19:
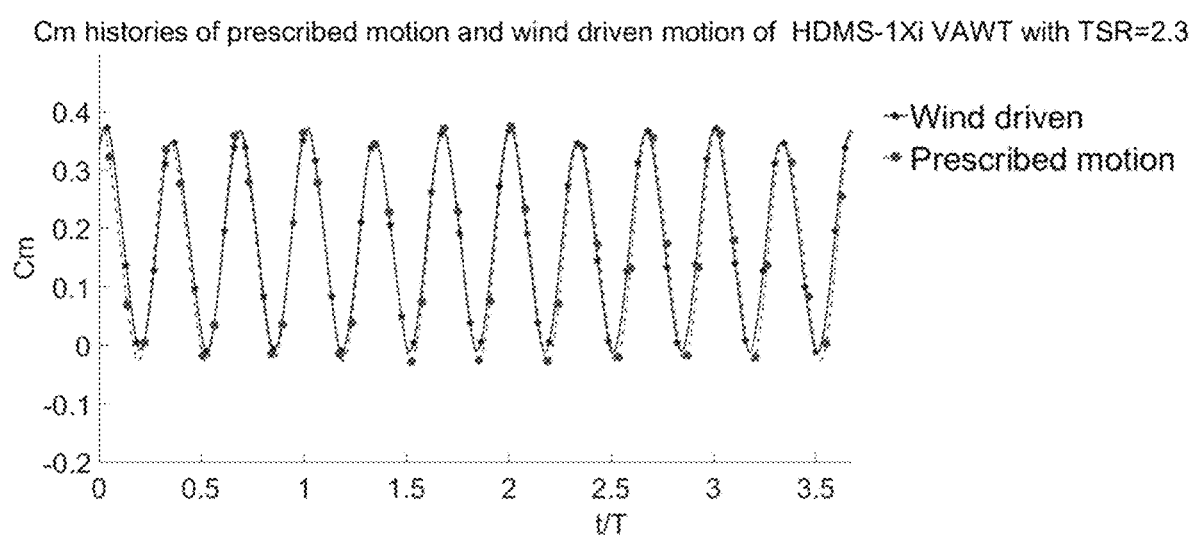
FIG. 19 illustrates the comparison of the histories of the moment coefficients for the VAWTs with wind-driven and prescribed motions.

To verify the consistency between the results with the prescribed motion and those with the wind-driven motion, a numerical test was conducted by using the HDMS-1Xi VAWT with prescribed motion. As observed from the wind-driven test from above (3.1), the angular velocity of the VAWT was periodic. For simplicity, the mean angular velocity from the wind-driven simulation (or equivalently TSR=2.3) was used in the prescribed motion approach. FIG. 19 shows the histories of the aerodynamic moment coefficient for the prescribed motion and wind-driven motion approaches. It was observed that the variation of the moment coefficients for the two cases was small. The small difference between the two curves was due to the slightly different angular velocity. Thus, it was reasonable to use the prescribed motion to mimic the wind-driven motion of VAWTs when they reach a stable operation status.

Figure 20A:
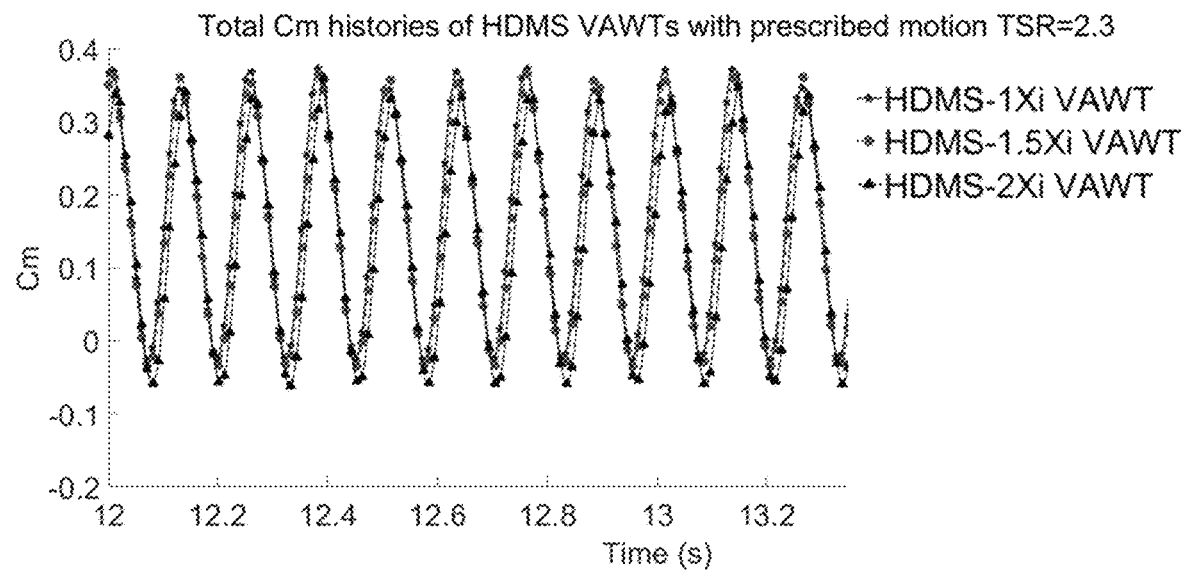
FIG. 20(a) illustrates the total moment coefficients of HDMS VAWTs with prescribed motion.
Figure 20B:
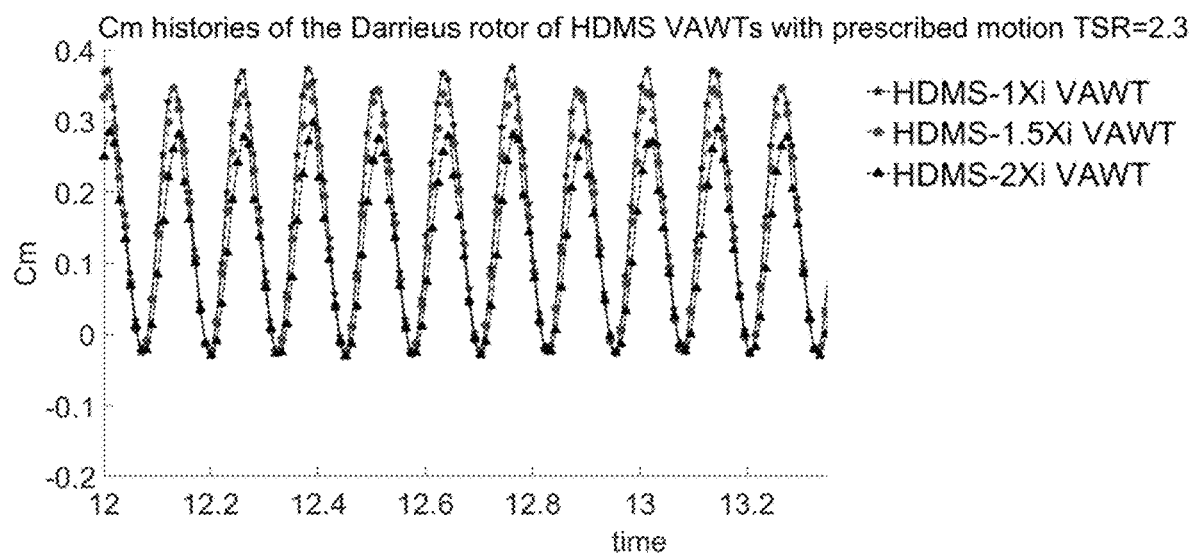
FIG. 20(b) illustrates the moment coefficients for the Darrieus rotor of HDMS VAWTs with prescribed motion.
Figure 20C:
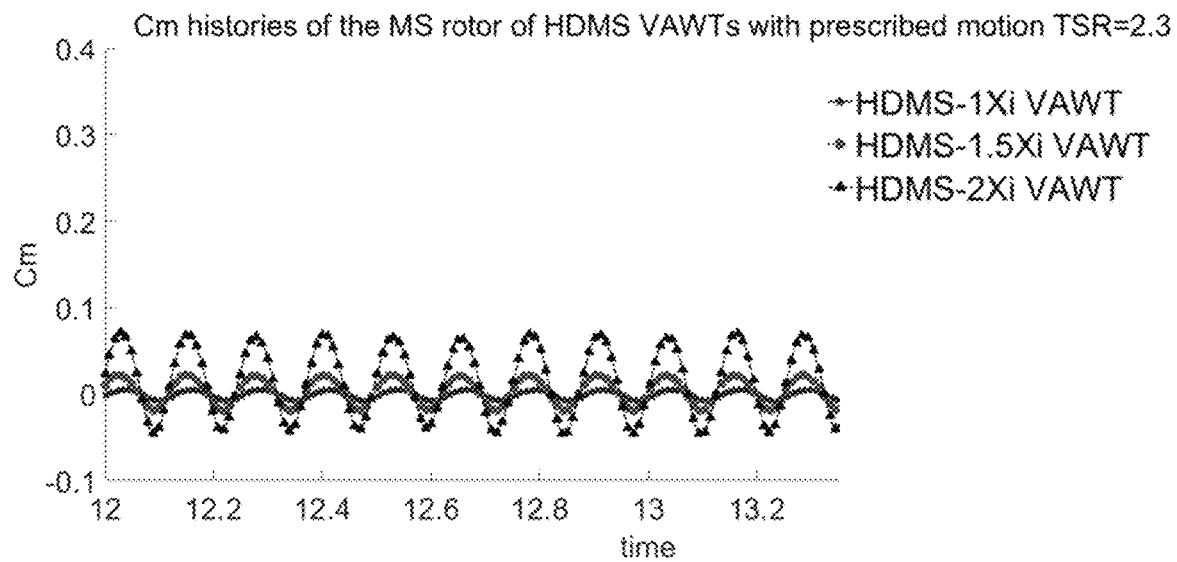
FIG. 20(c) illustrates the moment coefficients for the MS rotor of HDMS VAWTs with prescribed motion.

To study the performance of the outer Darrieus rotor and the inner MS rotor of the HDMS VAWTs, numerical simulation of the HDS-1Xi, FIDMS-1.5Xi, and HDMS-2Xi VAWTs with prescribed motion were performed when TSR was 2.3. The results are presented in FIG. 20 and Table 3. It was observed that when the size of the inner MS rotor increases, the total aerodynamic moment acting on the wind turbine decreases. This agrees with the tread observed from the wind-driven simulation. As observed from FIG. 20(c), the wind moment acting on the inner MS rotor increases when its size becomes larger. But compared with the total wind moment, the moment acting on the inner MS rotor was relatively small (see Table 3), Thus, when the HDMS VAWT works at desirable TSRs, the inner MS rotor does not contribute much to energy harvesting. Instead, as shown in FIG. 20(b), the wind moment acting on the Darrieus rotor has a large decrease when the size of the inner MS rotor increases. This severely penalizes the entire energy harvesting performance. This explains why an increase of the inner MS rotor's size will lead to a decrease of the power coefficient as observed in FIG. 15.

TABLE 3

Mean moment coefficients for different types of HDMS VAWTs.

| | HDMS-1Xi VAWT | HDMS-1.5Xi VAWT | HDMS-2Xi VAWT |
| --- | --- | --- | --- |
| Total $\overline{C}_m$ | 0.1688 | 0.1563 | 0.1329 |
| $\overline{C}_m$ on Darrieus rotor | 0.1698 | 0.1532 | 0.1178 |
| $\overline{C}_m$ on MS rotor | 0.0010 | 0.0031 | 0.0151 | b. Analysis Using 2.5D LES

A 2.5D case of the HDMS-1Xi VAWT rotating at the same angular velocity (TSR=2.3) as that of the 2D one was simulated using LES. As discussed in above (1.4), the mesh for LES was built by extruding the 2D HDMS-1Xi VAWT mesh in the spanwise direction with a height of 0.2 chord length of the Darrieus blade. 15 mesh layers were used in the spanwise direction. As a result, the mean $z^+$ was about 37. Note that similar to the definition of $y^+$, $z^+$ was a measure of the non-dimensional mesh size in the spanwise direction. The total element number of the mesh was over 1.6 million.

Figure 21:
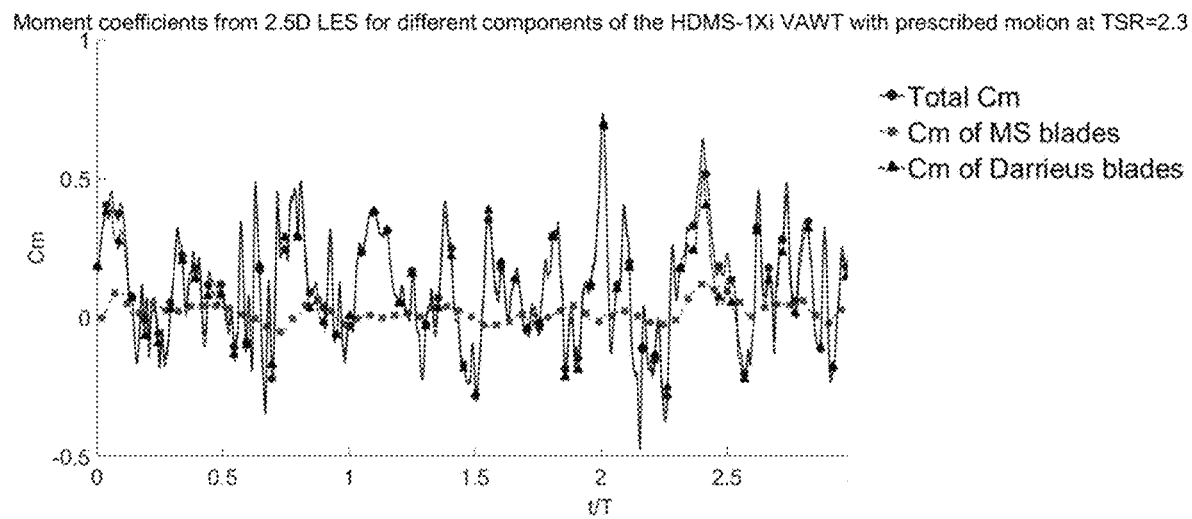
FIG. 21 illustrates the moment coefficients from 2.5D LES for different components of the. HDMS-1Xi VAWT with prescribed motion at TSR=2.3.
Figure 22B:
FIG. 22(b) shows the vortical structures represented by the iso-surface of the Q criterion with a value of 50,000 from 2.5D LES, specifically a view of vortices near the Darrieus blades without those near the MS blades.
Figure 22A:
FIG. 22(a) shows the vortical structures represented by the iso-surface of the Q criterion with a value of 50,000 from 2.5D LES, specifically a complete view of vortices near the HDMS-1Xi VAWT.

FIG. 21 shows the moment coefficient history within four periods after the flow reaches a statistical steady state. Similar to 2D URANS results shown in FIG. 20 and Table 3, the Darrieus blades contribute significantly to moment generation. Specifically, the mean moment coefficient of the MS blades (0.0219) was about ⅕ of the mean moment coefficient of the Darrieus blades (0.0992). Compared with the 2D LRANS results in Table 3, the mean moment coefficient of the MS blades increases when using 2.5D LES; by contrast, the reduction of the mean moment coefficient of the Darrieus blades was relatively large. Therefore, compared with the 2D URANS results, the energy harvesting performance evaluated by 2.5D LES was inferior. It was found that the power coefficient from 2.5D LES was about 28%, compared with 41% from 2D URANS, This observation agrees well with Li et al. [22] (also see FIG. 6), FIG. 22 shows the vortical structures represented by the iso-surface of the Q criterion with a value of 50,000. Note that a complete view of vortices near the HDMS-1Xi VAWT was presented in (a), and for clarity, a view of vortices near the Darrieus blades without those near the MS blades was shown in (b). From FIG. 22(a), it was observed that numerous small vortical structures were clustered in the vicinity of the MS blades. Meanwhile, as seen from FIG. 22(b), there were large vortical structures shedding from the Darrieus blades. Clearly, the interaction between the Darrieus blades and vortices with various scales was very complicated. This explains the highly unsteady features shown in the moment coefficient history of the Darrieus blades in FIG. 21. As mentioned previously, the moment coefficient (thus the power efficiency) of the 3D Darrieus blades was significantly reduced when compared with that of 2D ones. As evidenced in FIG. 22, the large flow separation over the Darrieus blades accounts for this power reduction. This also agrees with the observation by Li et al. [22] and FIG. 7(b).

Example 4

Figure 24:
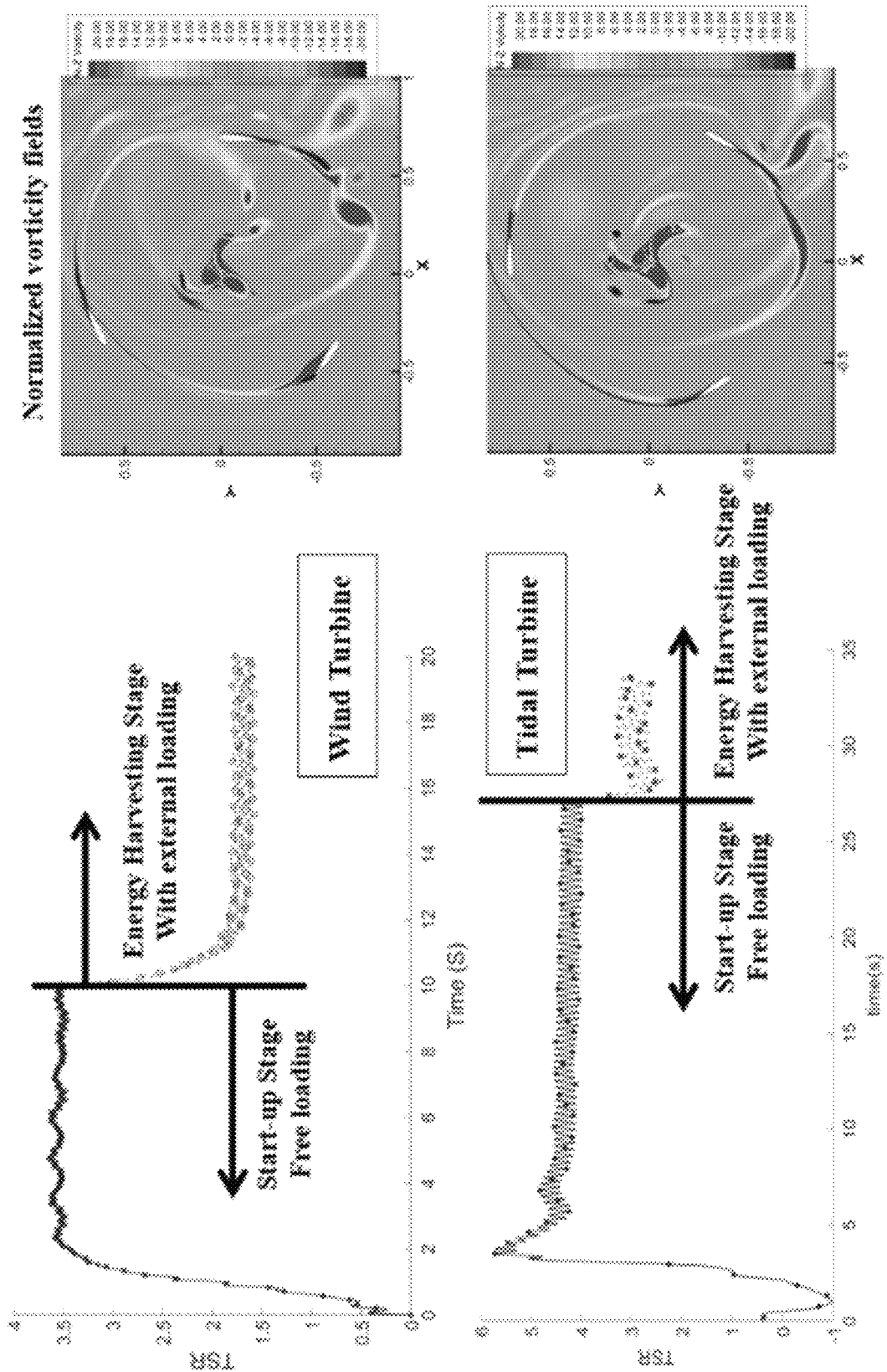
FIG. 24 illustrates the comparison of the start-up and energy harvesting performance of HDMS wind (top) and tidal (bottom) turbines.

Referring to FIG. 24, the start-up and energy harvesting performance of HDMS wind (top) and tidal (bottom) turbines was compared. The wind speed was 5 m/s, and the tidal speed was 1 m/s. On the left, the histories of the tip speed ratio (TSR) for the start-up and energy harvesting stages are presented. On the right, the normalized vorticity fields in the turbine axis direction are presented. It was observed that the energy harvesting efficiencies or power coefficients $C_p$ for the wind and tidal turbines are very similar (about 40%, or 67.5% of the Betz limit) to each other.

It is noted that if the HDMS VAWT described herein is mounted in shallow water, where the blockage ratio is large, e.g. 0.1~0.2, the energy harvesting efficiency can exceed the Betz limit due to the free surface effect [63]. Note that "blockage" is defined as the ratio of turbine frontal area to the cross-sectional area of the surrounding flow passage. A theoretical analysis with inviscid flow and actuator disk assumptions indicates that the peak power coefficient can increase from 60% (almost 100% of the Betz limit) to 93% as the blockage ratio increases from 0.05 to 0.2 [64]. Considering the viscous effects and turbine tip loss in practical fluid flows, the real peak power coefficient will be lower than the theoretical prediction, but can still exceed the Betz limit. This makes the HDMS VAWT described herein an attractive technology for shallow-water tidal energy harvesting.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore was to be broadly construed, as encompassing all such variations, modifications and alternative embodiments within the spirit and scope of the claims hereafter set forth.

REFERENCES

[1] J. O. Dabiri, Potential order-of-magnitude enhancement of wind farm power density via counter-rotating vertical-axis wind turbine arrays, J. Renew. Sustain. Energy, 3 (4) (2011), pp. 043-104
[2] M Kinzel, Q. Mulligan, J. O. Dabiri, Energy exchange in an array of vertical-axis wind turbines, J. Turbul., 13 (2012), p. N38
[3] J. O. Dabiri, Emergent aerodynamics in wind farms, Phys. Today, 67 (10) (2014), pp. 66-67
[4] J. O. Dabiri, J. R. Greer, J. R. Koseff, P. Moin, J. Peng, A new approach to wind energy: opportunities and challenges, AIP Conf. Proc., 1652 (2015), pp. 51-57
[5] U. Al-mulali, H. G. Fereidouni, J. Y. M. Lee, C. N. B. C. Sab, Exploring the relationship between urbanization, energy consumption, and CO2 emission in MENA countries, Renew. Sustain. Energy Rev., 23 (2013), pp. 107-112
[6] T. F. Ishugah, Y. Li, R. Z. Wang, J. K. Kiplagat, Advances in wind energy resource exploitation in urban environment: a review, Renew. Sustain. Energy Rev., 37 (2014), pp. 613-626
[7] L.A. Danao, O. Eboibi, R. Howell, An experimental investigation into the influence of unsteady wind on the performance of a vertical axis wind turbine, Appl. Energy, 107 (2013), pp. 403-411
[8] L.A. Danao, J. Edwards, O. Eboibi, R. Howell, A numerical investigation into the influence of unsteady wind on the performance and aerodynamics of a vertical axis wind turbine, Appl. Energy, 116 (2014), pp. 111-124
[9] D. W. Wekesa, C. Wang, Y. Wei, L. A. M. Danao, Influence of operating conditions on unsteady wind performance of vertical axis wind turbines operating within a fluctuating free-stream: a numerical study, J. Wind Eng. Ind. Aerod., 135 (2014), pp. 76-89
[10] D. W. Wekesa, C. Wang, Y. Wei, J. N. Kamau, L. A. M. Danao A numerical analysis of unsteady inflow wind for site specific vertical axis wind turbine: a case study for Marsabit and Garissa in Kenya, Renew. Energy, 76 (2015), pp. 648-661
[11] D. W. Wekesa, C. Wang, Y. Wei, W. Zhu, Experimental and numerical study of turbulence effect on aerodynamic performance of a small-scale vertical axis wind turbine, J. Wind Eng. Ind. Aerod., 157 (2016), pp. 1-14
[12] I. ParaschivoiuWind Turbine Design: with Emphasis on Darrieus Concept, Presses inter Polytechnique (2002)
[13] M. Islam, D. S.-K. Ting, A. Fartaj, Aerodynamic models for Darrieus-type straight-bladed vertical axis wind turbines, Renew. Sustain. Energy Rev., 12 (4) (2008), pp. 1087-1109
[14] S. Eriksson, H. Bernhoff, M. Leijon, Evaluation of different turbine concepts for wind power, Renew. Sustain. Energy Rev., 12 (5) (2008), pp. 1419-1434
[15] H. J. Sutherland, D. E. Berg, T. D. Ashwill, A retrospective of VAWT technology, Sandia National Laboratories, Albuquerque, New Mexico and Livermore, Calif. (2012)
[16] M. Mahmood, A. Bhutta, N. Hayat, A. U. Farooq, Z. Ali, S. R. Jamil, Z. Hussain, Vertical axis wind turbine a review of various configurations and design techniques, Renew. Sustain. Energy Rev., 16 (4) (2012), pp. 1926-1939
[17] D. MacPhee, A. Beyene, Recent advances in rotor design of vertical Axis wind turbines, Wind Eng., 36 (6) (2012), pp. 647-665
[18] C. Kang, H. Liu, X. Yang, Review of fluid dynamics aspects of Savonius-rotor-based vertical-axis wind rotors, Renew. Sustain. Energy Rev., 33 (2014), pp. 499-508
[19] M. Ragheb, Vertical Axis Wind Turbines, University of Illinois at Urbana-Champaigh, Urbana-Champaign, Ill. (2008)
[20] J. Baker, Features to aid or enable self starting of fixed pitch low solidity vertical axis wind turbines, J. Wind Eng. Ind. Aerod., 15 (1) (1983), pp. 369-380
[21] B. Kirkle, L. Lazauskas, Enhancing the performance of vertical axis wind turbine using a simple variable pitch system, Wind Eng., 15 (4) (1991), pp. 187-195
[22] C. Li, S. Zhu, Y. Xu, Y. Xiao, 2.5D large eddy simulation of vertical axis wind turbine in consideration of high angle of attack flow, Renew. Energy, 51 (2013), pp. 317-330
[23] Y. Bazilevs, A. Korobenko, X. Deng, J. Yan, M Kinzel, J. O. Dabiri, Fluidstructure interaction modeling of vertical-Axis wind turbines, J. Appl. Mech., 81 (8) (2014), 081006-081006-8
[24] A.-J. Buchner, M. Lohry, L. Martinelli, J. Soria, A. J. Smits, Dynamic stall in vertical axis wind turbines: comparing experiments and computations, J. Wind Eng. Ind. Aerod., 146 (2015), pp. 163-171
[25] R. Dominy, P. Lunt, A. Bickerdyke, J. Dominy, Self-starting capability of a Darrieus turbine, Proc. IME J. Power Energy, 221 (1) (2007)
[26] N. Hill, R. Dominy, G. Ingram, J. Dominy, Darrieus turbines: the physics of self-starting, Proc. IME J. Power Energy, 223 (1) (2009), pp. 21-29
[27] M. Nakajima, S. Iio, T. Ikeda, Performance of double-step Savonius rotor for environmentally friendly hydraulic turbine, J. Fluid Sci. Technol., 3 (2008), pp. 410-419
[28] M. A. Kamoji, S. B. Kedare, S. V. Prabhu, Performance tests on helical Savonius rotors, Renew. Energy, 34 (3) (2009), pp. 521-529
[29] R. Gupta, A. Biswas, Computational fluid dynamics analysis of a twisted three bladed H-Darrieus rotor, J. Renew. Sustain. Energy, 2 (4) (2010), Article 043111
[30] M. R. Castelli, E. Benini, Effect of blade inclination angle on a Darrieus wind turbine, J. Turbomach., 134 (3) (2011), 031016-031016-10
[31] M. Mohamed, Impacts of solidity and hybrid system in small wind turbines performance, Energy, 57 (2013), pp. 495-504
[32] M. Singh, A. Biswas, R. Misra, Investigation of self-starting and high rotor solidity on the performance of a three S1210 blade H-type Darrieus rotor, Renew. Energy, 76 (2015), pp. 381-387
[33] I. Paraschivoiu, O. Trifu, H-darrieus wind turbine with blade pitch control, Int. J. Rotating Mach., 2009 (2009), pp. 1-7
[34] F. Ponta, J. Seminara, A. Otero, On the aerodynamics of variable-geometry oval-trajectory Darrieus wind turbines, Renew. Energy, 32 (1) (2007), pp. 35-56
[35] M. Mohamed, G. Janiga, E. Pap, D. Thevenin, Optimization of Savonius turbines using an obstacle shielding the returning blade, Renew. Energy, 35 (11) (2010), pp. 2618-2626
[36] M. Mohamed, G. Janiga, E. Pap, D. Thevenin, Optimal blade shape of a modified Savonius turbine using an

[36] obstacle shielding the returning blade, Energy Conyers. Manag., 52 (1) (2011), pp. 236-242

[37] A. Damak, Z. Driss, M. Abid, Experimental investigation of helical Savonius rotor with a twist of 180°, Renew. Energy, 52 (2013), pp. 136-142

[38] R. J. Preen, L. Bull, Toward the coevolution of novel vertical-Axis wind turbines, Trans. Evol. Comput., 19 (2) (2015), pp. 284-294

[39] K. Irabu, J. N. Roy, Characteristics of wind power on Savonius rotor using a guide-box tunnel, Exp. Therm. Fluid Sci., 32 (2) (2007), pp. 580-586

[40] B. D. Altan, M. Atilgan, An experimental and numerical study on the improvement of the performance of Savonius wind rotor, Energy Conyers. Manag., 49 (12) (2008), pp. 3425-3432

[41] B. K. Debnath, A. Biswas, R. Gupta, Computational fluid dynamics analysis of a combined three-bucket Savonius and three-bladed Darrieus rot, J. Renew. Sustain. Energy, 1 (3) (2009), Article 033110

[42] J. Gavalda, J. Massons, F. Diaz, Experimental study on a self-adapting DarrieusSavonius wind machine, Sol. Wind Technol., 7 (4) (1990), pp. 457-461

[43] W. Kou, X. Shi, B. Yuan, L. Fan, Modeling analysis and experimental research on a combined-type vertical axis wind turbine, 2011 International Conference on Electronics, Communications and Control (ICECC), Ningbo, China (2011)

[44] T. Wakui, Y. Tanzawa, T. Hashizume, T. Nagao, Hybrid configuration of Darrieus and Savonius rotors for stand-alone wind turbine-generator systems, Electr. Eng. Jpn., 150 (4) (2005), pp. 13-22

[45] Y. Kyozuka, An experimental study on the darrieus-savonius turbine for the tidal current power generation, J. Fluid Sci. Technol., 3 (2008), pp. 439-449

[46] S. Bhuyan, A. Biswas, Investigations on self-starting and performance characteristics of simple H and hybrid H-Savonius vertical axis wind rotors—science direct, Energy Conyers. Manag., 87 (2014), pp. 859-867

[47] B. E. Anderson, "Enclosed vertical axis fluid rotor". USA Patent US20110142641 A1, 14 Oct. 2010.

[48] D. B. Araya, J. O. Dabiri, A comparison of wake measurements in motor-driven and flow-driven turbine experiments, Exp. Fluid, 56 (7) (2015), p. 150

[49] C. S. Ferreira, G. V. Bussel, G. V. Kuik, F. Scarano, 2D PIV visualization of dynamic stall on a vertical Axis wind turbine, 45th AIAA Aerospace Sciences Meeting and Exhibit, Reno, Nevada (2007)

[50] M. R. Castelli, G. Ardizzon, L. Battisti, E. Benini, G. Pavesi, Modeling strategy and numerical validation for a Darrieus vertical Axis micro-wind turbine, ASME 2010 International Mechanical Engineering Congress & Exposition, Vancouver, British Columbia, Canada (2010)

[51] H. Beri, Y. Yao, Double multiple streamtube model and numerical analysis of vertical Axis wind turbine, Energy Power Eng., 3 (3) (2011), pp. 262-270

[52] R. Nobile, M. Vandati, J. F. Barlow, A. Mewburn-Crook, Unsteady flow simulation of a vertical axis augmented wind turbine: a two-dimensional study, J. Wind Eng. Ind. Aerod., 125 (2014), pp. 168-179

[53] F. Trivellato, M. Castelli, On the CourantFriedrichsLewy criterion of rotating grids in 2D vertical-axis wind turbine analysis, Renew. Energy, 62 (2014), pp. 53-62

[54] Y. Wang, X. Sun, X. Dong, B. Zhu, D. Huang, Z. Zheng, Numerical investigation on aerodynamic performance of a novel vertical axis wind turbine with adaptive blades, Energy Conyers. Manag., 108 (2016), pp. 275-286

[55] K. W. McLaren, A Numerical and Experimental Study of Unsteady Loading of High Solidity Vertical Axis Wind Turbines, McMaster University, Ontario, Canada (2011)

[56] A. Betz, Introduction to the Theory of Flow Machines, Pergamon Press, Oxford, UK (1966)

[57] N. N. Sorensen, J. A. Michelsen, Drag prediction for blades at high angle of attack using CFD, J. Sol. Energy Eng., 126 (4) (2004), pp. 1011-1016

[58] A. Travin, M. Shur, M. Strelets, P. R. Spalart, Physical and numerical upgrades in the detached-eddy simulation of complex turbulent flows, Advances in LES of Complex Flows, Springer, Dordrecht (2002), pp. 239-254

[59] A. Uihlein and D. Magagna, "Wave and tidal current energy—A review of the current state of research beyond technology," *Renewable and Sustainable Energy Reviews,* vol. 58, pp. 1070-1081, 2016.

[60] E. Denny, "The economics of tidal energy," Energy Policy, vol. 37, pp. 1914-1924, 2009.

[61] N. D. Laws and B. P. Epps, "Hydrokinetic energy conversion: Technology, research, and outlook," *Renewable and Sustainable Energy Reviews,* vol. 57, pp. 1245-1259, 2016.

[62] 0. Rourke, F. Boyle and A. Reynolds, "Tidal energy update 2009," Applied Energy, vol. 87, pp. 398-409, 2010.

[63] G. T. Houlsby and C. R. Vogel, "The power available to tidal turbines in an open channel flow," *Proceedings of the Institution of Civil Engineers—Energy,* vol. 170, pp. 12-21, 2017.

[64] A. C. Orrell and N. F. Foster, "2014 Distributed Wind Market Report," U.S. Department of Energy, Richland, Wash., 2015.

What was claimed is:

1. A hybrid vertical fluid turbine apparatus, comprising:
(a) a first rotor system positioned in a central region and rotatable about a central axis, wherein the first rotor system comprises:
(i) at least two blade-sets stacked vertically along the central axis, each blade-set comprising a plurality of first blades that are equiangularly spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
(ii) a hydraulic brake system that is mounted upon the shaft with bearings; and
(b) a second rotor system positioned in an annular region surrounding the first rotor system in the central region, wherein the second rotor system comprises a plurality of second blades equiangularly spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

2. The hybrid vertical fluid turbine of claim 1, wherein each blade-set includes a circular top plate and a circular bottom plate, wherein the circular plates are substantially perpendicular to the central axis, and wherein the plurality of first blades are positioned therebetween.

3. The hybrid vertical fluid turbine of claim 1, wherein the plurality of second blades are straight-bladed.

4. The hybrid vertical fluid turbine of claim 1, wherein each blade-set comprises three first blades located at approximately 0 degrees, 120 degrees, and 240 degrees about the central axis.

5. The hybrid vertical fluid turbine of claim I, wherein the first blades in each blade-set are offset about 20-60 degrees about the central axis from the first blades in each other blade-set.

6. The hybrid vertical fluid turbine of claim 1, wherein the hybrid vertical fluid turbine apparatus rotates about the central axis in at least one of a clockwise manner or a counter clockwise manner.

7. The hybrid vertical fluid turbine of claim 1, wherein the shaft is a static non-turning shaft, and the first rotor system is mounted upon, and rotates around, the static non-turning shaft.

8. The hybrid vertical fluid turbine of claim 1, wherein the shaft is a rotating shaft, and the first rotor system is attached to the rotating shaft, and the rotating shaft rotates about the central axis.

9. The hybrid vertical fluid turbine of claim 2, wherein each first blade is rectangular and has a first blade length and a first blade height, wherein the first blade height is equal to the distance between the circular top and bottom plates in the blade-set, and wherein the first blade length is greater than a radius of the circular top and bottom plates, leading to the concave shape.

10. The hybrid vertical fluid turbine of claim 1, wherein the first rotor system comprises at least three blade-sets.

11. The hybrid vertical fluid turbine of claim 1, wherein one plate-set can share a circular plate with another plate-set.

12. The hybrid vertical fluid turbine of claim 1, wherein a ratio of a radius $R_o$ of the second blades about the central axis relative to a radius $R_i$ of the first blades about the central axis is in a range from about 1.5 to about 4.

13. The hybrid vertical fluid turbine of claim 1, wherein a ratio of a radius $R_o$ of the second blades about the central axis relative to a radius $R_i$ of the first blades about the central axis is in a range from about 2.5 to about 3.5.

14. The hybrid vertical fluid turbine of claim 1, wherein a ratio of a radius $R_o$ of the second blades about the central axis relative to a chord length of the second blades is in a range from about, 1.5 to about 4.

15. The hybrid vertical fluid turbine of claim 1, wherein a ratio of a radius $R_o$ of the second blades about the central axis relative to a chord length of the second blades is in a range from about 2.5 to about 3.5.

16. The hybrid vertical fluid turbine of claim 1, wherein a nonlinear interaction exists between the first rotor system and the second rotor system.

17. The hybrid vertical fluid turbine of claim 1, wherein the greatest energy harvesting efficiency is achieved at a tip speed ratio (TSR) values greater than about 2.0.

18. The hybrid vertical fluid turbine of claim 1, wherein a tip of the first blade of the first rotor system is aligned with an aerodynamic center of a corresponding second blade of the second rotor system.

19. The hybrid vertical fluid turbine of claim 1, wherein the fluid is air.

20. The hybrid vertical fluid turbine of claim 1, wherein the fluid is water.

* * * * *

UNITED STATES PATENT AND TRADEMARK OFFICE
CERTIFICATE OF CORRECTION

PATENT NO. : 11,313,348 B2
APPLICATION NO. : 16/851602
DATED : April 26, 2022
INVENTOR(S) : Yu et al.

It is certified that error appears in the above-identified patent and that said Letters Patent is hereby corrected as shown below:

In the Claims

Claim 5, Column 27, Line 5 reads:
"The hybrid vertical fluid turbine of claim I"

Whereas it should read:
"The hybrid vertical fluid turbine of claim 1"

Signed and Sealed this
Seventh Day of June, 2022

Katherine Kelly Vidal
*Director of the United States Patent and Trademark Office*